United States Patent
Lundh et al.

(12) 
(10) Patent No.: US 6,195,758 B1
(45) Date of Patent: Feb. 27, 2001

(54) OPERATION AND MAINTENANCE OF CLOCK DISTRIBUTION NETWORKS HAVING REDUNDANCY

(75) Inventors: Peter Lundh, Skärholmen; Mats Wilhelmsson, Hägersten; Anders Bjenne, Huddinge, all of (SE)

(73) Assignee: le;.5qTelefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/049,327

(22) Filed: Mar. 27, 1998

Related U.S. Application Data

(63) Continuation of application No. PCT/SE96/01211, filed on Sep. 29, 1996.

(30) Foreign Application Priority Data

Sep. 29, 1995 (SE) .................................................. 9503371

(51) Int. Cl.[7] .............................. G06F 1/06; G06F 13/00
(52) U.S. Cl. .......................................... 713/500; 710/131
(58) Field of Search .................................. 713/400, 600, 713/500, 501; 714/5, 6, 703, 707, 731, 744, 742, 814, 815, 41; 709/400

(56) References Cited

U.S. PATENT DOCUMENTS

| | | |
|---|---|---|
| 4,105,900 | 8/1978 | Martin et al. . |
| 4,185,245 | 1/1980 | Fellinger et al. . |
| 4,239,982 | 12/1980 | Smith et al. . |
| 4,489,412 | 12/1984 | Duplessis et al. . |
| 4,598,257 | 7/1986 | Southard . |
| 4,672,299 | 6/1987 | Grimes et al. . |
| 4,692,932 | 9/1987 | Denhez et al. . |
| 4,698,826 | 10/1987 | Denhez et al. . |
| 4,788,670 | 11/1988 | Hofmann et al. . |
| 5,065,454 | 11/1991 | Binz et al. . |
| 5,276,690 | * 1/1994 | Lee .................................... 714/703 |
| 5,305,325 | * 4/1994 | Roos ................................... 714/703 |
| 5,377,325 | * 12/1994 | Chan .................................. 713/400 |
| 5,467,466 | * 11/1995 | Carlson ............................... 395/550 |
| 5,524,237 | * 6/1996 | Bestler ............................... 713/600 |
| 5,537,583 | * 7/1996 | Truong ................................ 395/550 |
| 5,537,655 | * 7/1996 | Truong ................................ 395/182 |
| 5,600,784 | * 2/1997 | Bissett ............................... 709/400 |
| 5,612,966 | * 3/1997 | Lee .................................... 714/815 |
| 5,642,069 | * 6/1997 | Waite .................................. 327/292 |
| 5,651,113 | * 7/1997 | Lin .................................... 714/815 |
| 5,742,766 | * 4/1998 | Takeuchi ............................. 709/400 |
| 5,758,132 | * 5/1998 | Strahlin .............................. 709/400 |
| 5,809,289 | * 9/1998 | Bae .................................... 713/600 |
| 5,852,728 | * 12/1998 | Matsuda et al. ...................... 395/556 |
| 5,890,003 | * 3/1999 | Cutts, Jr. et al. ................... 395/736 |
| 5,898,895 | * 4/1999 | Williams ............................. 713/500 |

FOREIGN PATENT DOCUMENTS

| | | |
|---|---|---|
| 0 303 916 | 2/1989 | (EP) . |
| 0 365 819 | 5/1990 | (EP) . |
| 0 366 326 | 5/1990 | (EP) . |
| 60-225982 | 11/1985 | (JP) . |
| 94/24793 | 10/1994 | (WO) . |

* cited by examiner

*Primary Examiner*—Thomas C. Lee
*Assistant Examiner*—Nitin Patel
(74) *Attorney, Agent, or Firm*—Burns, Doane, Swecker & Mathis, L.L.P.

(57) ABSTRACT

In a network, such as a large telecommunication switch, intended for the processing of information in different stations and for transmitting information between the stations, circuits are provided which generate independently composite clock signals containing both a clocking rate and a frame synchronizing rate. These clock signals are transmitted on three different transmission lines in parallel and independently to a station, where some kind of information processing is made in redundant planes. In the station all incoming clock signals are fed to each one of three independently operating selector units in which a choice of a clock signal is made for obtaining a clock signal to be used in the three redundant planes arranged in parallel to each other and operating independently of each other, in the station.

47 Claims, 13 Drawing Sheets

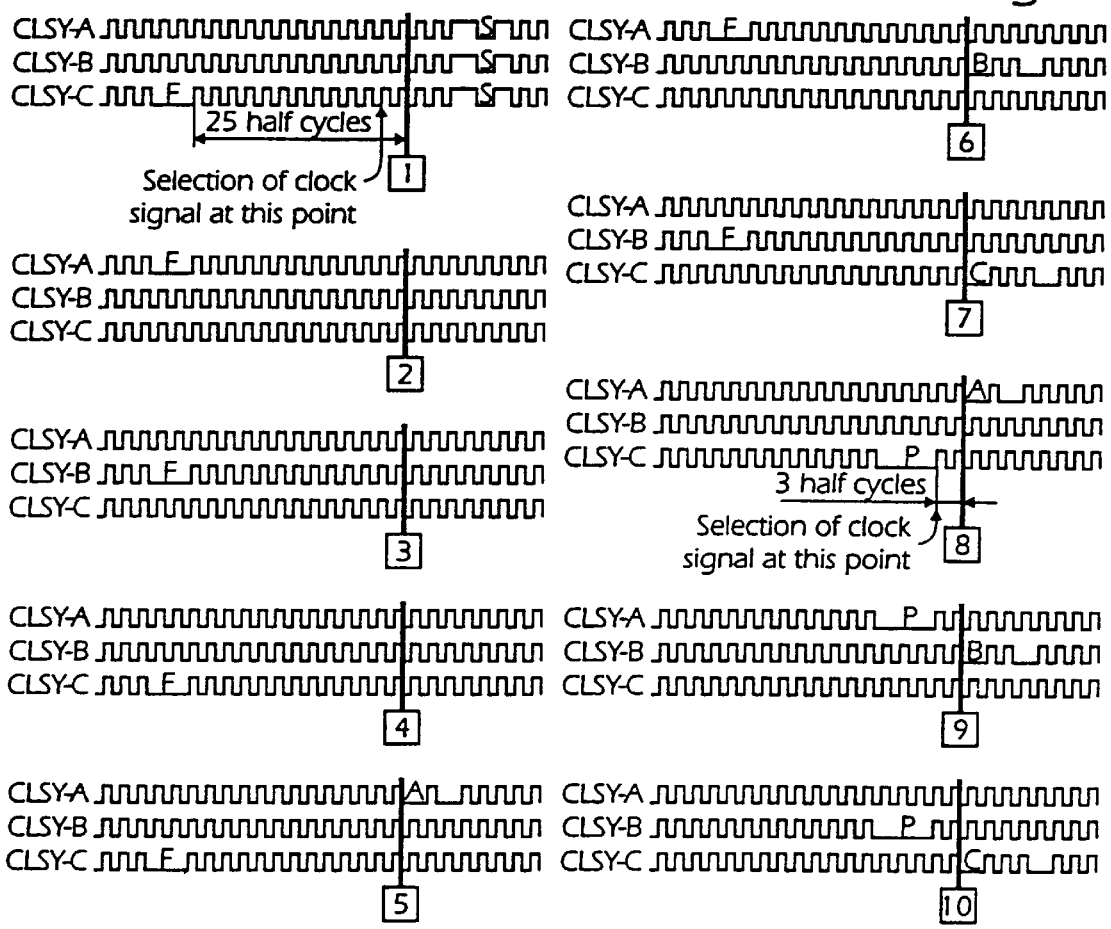
Fig. 3
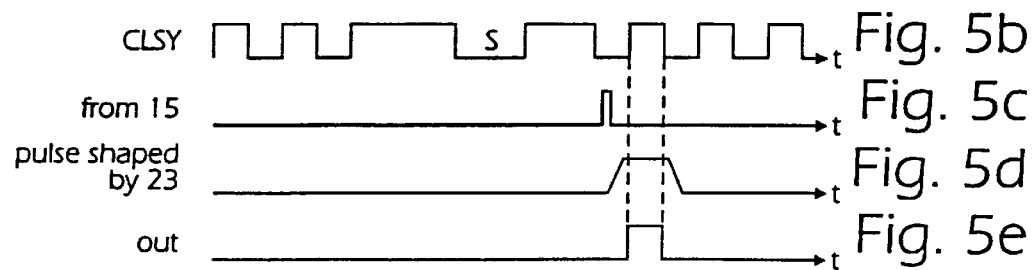
Fig. 5b
Fig. 5c
Fig. 5d
Fig. 5e

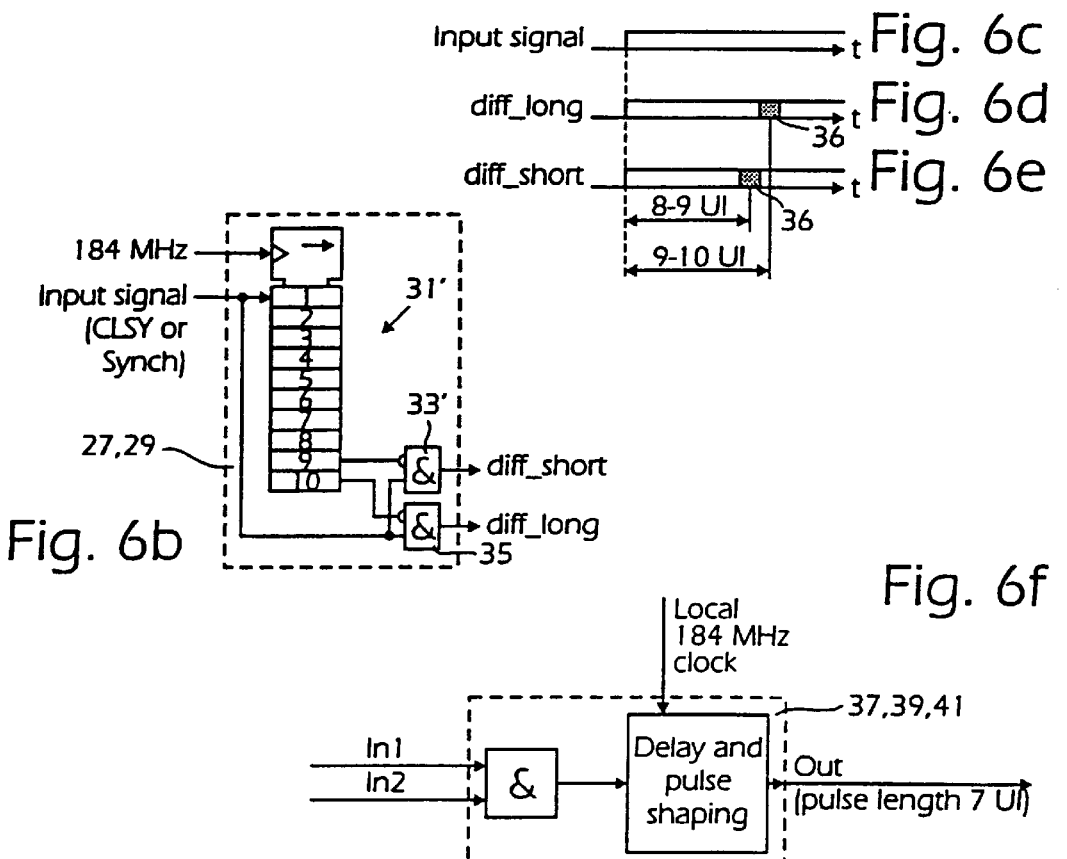
Fig. 6c — Input signal
Fig. 6d — diff_long
Fig. 6e — diff_short
Fig. 6b
Fig. 6f
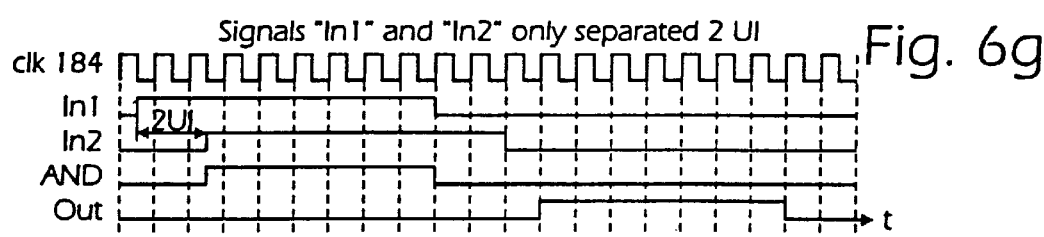
Fig. 6g
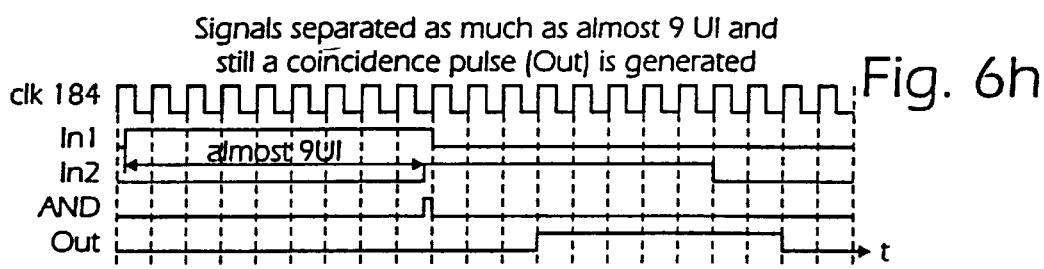
Fig. 6h
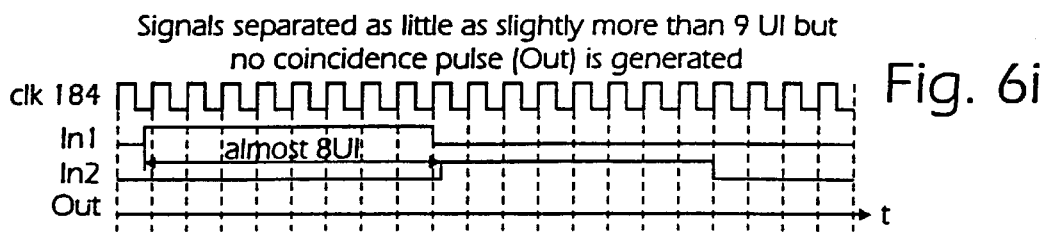
Fig. 6i

Fig. 7b

| phase error A/B | phase error B/C | phase error C/A | frequency error A | frequency error B | frequency error C | Available signals |
|---|---|---|---|---|---|---|
| no phase error | | | | | | |
| 0 | 0 | 0 | 0 | 0 | 0 | ABC |
| | | | 0 | 0 | 1 | AB |
| | | | 0 | 1 | 0 | CA |
| | | | 0 | 1 | 1 | A |
| | | | 1 | 0 | 0 | BC |
| | | | 1 | 0 | 1 | B |
| | | | 1 | 1 | 0 | C |
| | | | 1 | 1 | 1 | A |
| one phase error | | | | | | |
| 0 | 0 | 1 | 0 | 0 | 0 | AB |
| | | | 0 | 0 | 1 | AB |
| | | | 0 | 1 | 0 | A |
| | | | 0 | 1 | 1 | A |
| | | | 1 | 0 | 0 | B |
| | | | 1 | 0 | 1 | B |
| | | | 1 | 1 | 0 | C |
| | | | 1 | 1 | 1 | A |
| one phase error | | | | | | |
| 0 | 1 | 0 | 0 | 0 | 0 | CA |
| | | | 0 | 0 | 1 | A |
| | | | 0 | 1 | 0 | CA |
| | | | 0 | 1 | 1 | A |
| | | | 1 | 0 | 0 | C |
| | | | 1 | 0 | 1 | B |
| | | | 1 | 1 | 0 | C |
| | | | 1 | 1 | 1 | A |
| phase error on C | | | | | | |
| 0 | 1 | 1 | 0 | 0 | 0 | AB |
| | | | 0 | 0 | 1 | AB |
| | | | 0 | 1 | 0 | A |
| | | | 0 | 1 | 1 | A |
| | | | 1 | 0 | 0 | B |
| | | | 1 | 0 | 1 | B |
| | | | 1 | 1 | 0 | C |
| | | | 1 | 1 | 1 | A |

| phase error A/B | phase error B/C | phase error C/A | frequency error A | frequency error B | frequency error C | Available signals |
|---|---|---|---|---|---|---|
| one phase error | | | | | | |
| 1 | 0 | 0 | 0 | 0 | 0 | BC |
| | | | 0 | 0 | 1 | B |
| | | | 0 | 1 | 0 | C |
| | | | 0 | 1 | 1 | A |
| | | | 1 | 0 | 0 | BC |
| | | | 1 | 0 | 1 | B |
| | | | 1 | 1 | 0 | C |
| | | | 1 | 1 | 1 | A |
| phase error on A | | | | | | |
| 1 | 0 | 1 | 0 | 0 | 0 | BC |
| | | | 0 | 0 | 1 | B |
| | | | 0 | 1 | 0 | C |
| | | | 0 | 1 | 1 | A |
| | | | 1 | 0 | 0 | BC |
| | | | 1 | 0 | 1 | B |
| | | | 1 | 1 | 0 | C |
| | | | 1 | 1 | 1 | A |
| phase error on B | | | | | | |
| 1 | 1 | 0 | 0 | 0 | 0 | CA |
| | | | 0 | 0 | 1 | A(B) |
| | | | 0 | 1 | 0 | CA |
| | | | 0 | 1 | 1 | A |
| | | | 1 | 0 | 0 | C |
| | | | 1 | 0 | 1 | B |
| | | | 1 | 1 | 0 | C |
| | | | 1 | 1 | 1 | A |
| phase error between all signals | | | | | | |
| 1 | 1 | 1 | 0 | 0 | 0 | A |
| | | | 0 | 0 | 1 | A(B) |
| | | | 0 | 1 | 0 | A |
| | | | 0 | 1 | 1 | A |
| | | | 1 | 0 | 0 | B |
| | | | 1 | 0 | 1 | B |
| | | | 1 | 1 | 0 | C |
| | | | 1 | 1 | 1 | A |

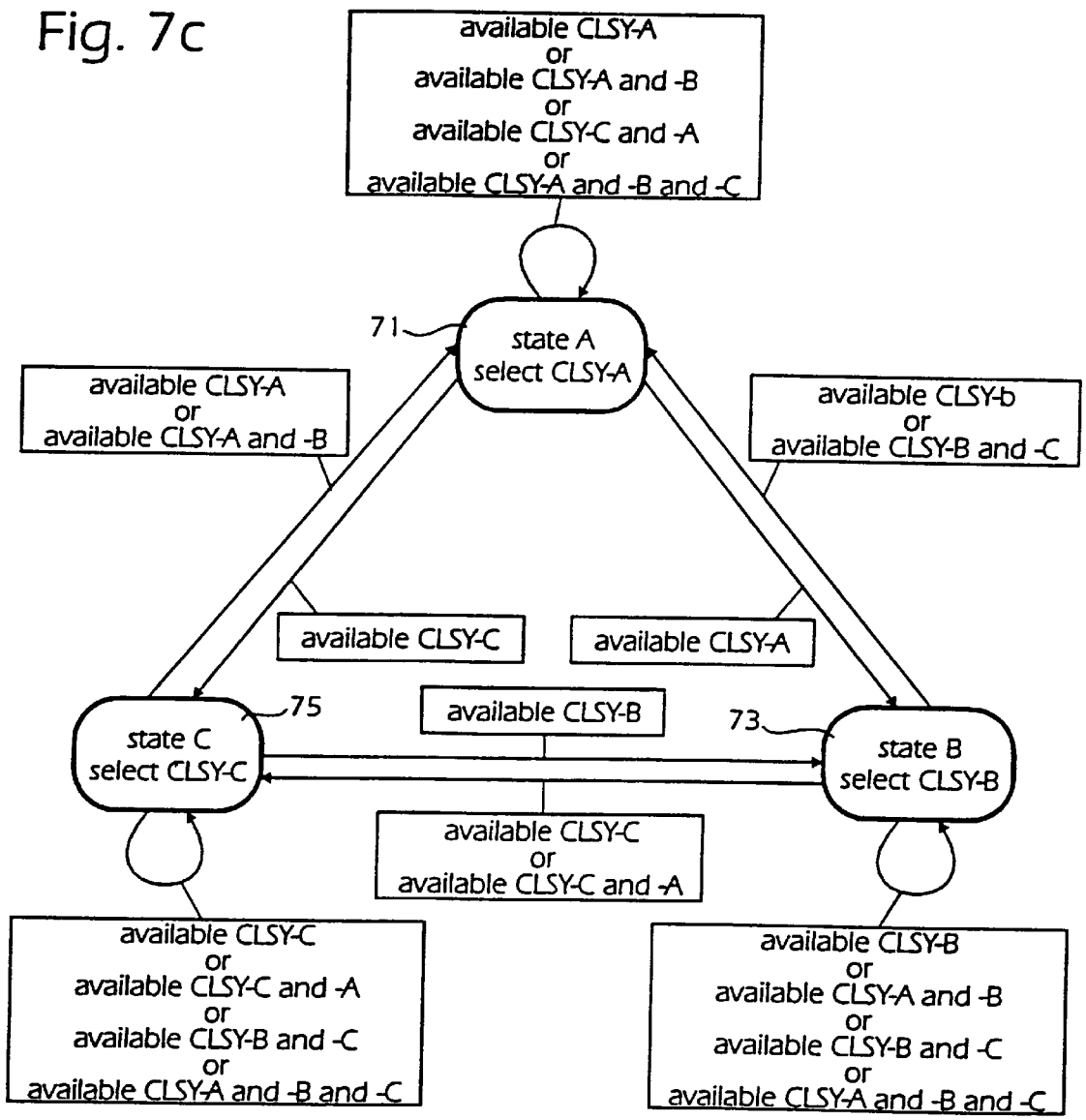

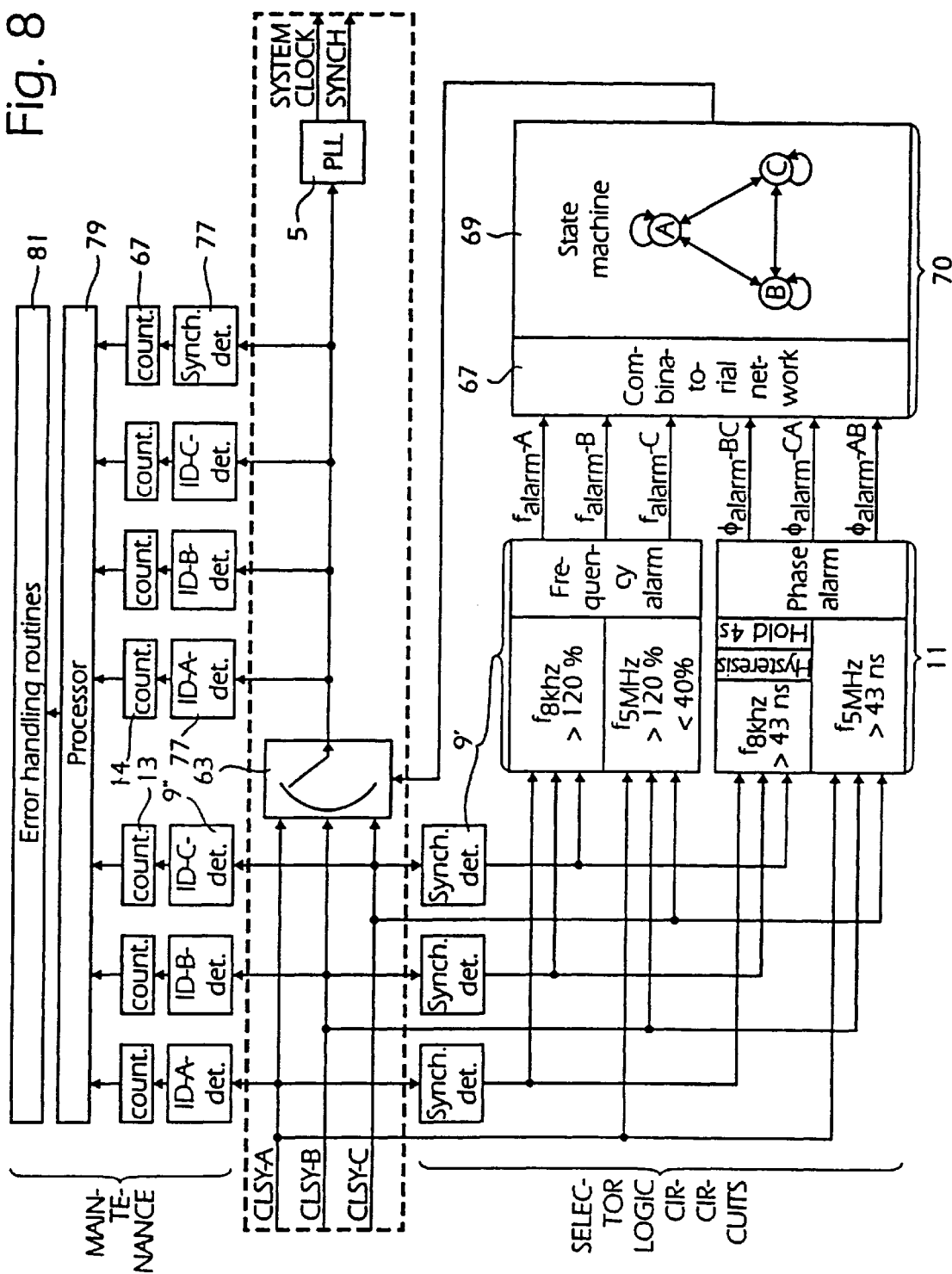

OPERATION AND MAINTENANCE OF CLOCK DISTRIBUTION NETWORKS HAVING REDUNDANCY

This application is a continuation of International Application No. PCT/SE96/01211, which was filed on Sep. 29, 1996, which designated the United States, and which is expressly incorporated here by reference.

TECHNICAL FIELD

The present invention relates to distribution of a clock signal having redundancy to a user of the signal and in particular methods and devices for maintenance of circuits for distribution and of circuits for selecting a suitable clock signal. It also relates to networks or installations having maintenance functions provided therein. Further, it relates to a method and a clock source for providing a clock signal having identification information contained or hidden therein. It relates also to a method and a device for processing a clock signal to detect information contained therein. It relates to a method and a clock source for providing a clock signal having intentional errors contained therein. It relates to a method and a device for processing a clock signal in order to determine errors, in particular frequency and phase errors, in a clock signal. Further, the invention also relates to supplying redundant clock signals to cascaded subsystems, i.e. subsystems connected to each other serially, the clock signal passing through one subsystem where it is processed and then issued as a new clock signal to a following subsystem, etc. It further relates to methods and devices for evaluating two clock signals as to the timing of timing pulses in the clock signals in relation to each other. The invention relates also to a method and a device for producing a pulse indicating a signal sequence detected inside a clock signal. Finally, it relates to a method and a device for detecting a signal sequence contained or hidden in a clock signal.

BACKGROUND

In the field of telephone connections and in telecommunication equipment generally, as a rule there exists a need for distribution of two clocking signals, herein called clock and synchronizing pulse rates, the latter one called "synch rate" in short, to various sub25 equipments and components therein. This distribution is particularly wide in physically large connected systems, such as in the type of switches having various multiplexing stages and similar units. The clock rate has generally a high frequency and among other things defines borders for bits in the data flowing through the equipment and the synch rate has a low frequency and defines frame borders and similar things in the data signal. The number of signals transferring clock and synch information in an equipment such as a telecommunication switch station can be rather large and in the following the general expression "the clock distribution network" is used therefor. Telecommunication equipment in a magazine or cabinet, etc., has a considerable multitude of transmission components for rate distribution in the shape of cables, pins in back planes and electrical terminals, lines in back planes, etc. The space required for all such signal connections is considerable and costs money. As a rule, the number of pins in a connector is a small resource limiting the size of for example a switch.

In equipments having large requirements of their reliability the clock distribution network must of course also fulfil large reliability requirements. The reliability of the clock distribution network can be enhanced, in the conventional way, by introducing redundancy. If the clock distribution and the clock source are designed to include redundancy, i.e. that they may be duplicated or, as is supposed in the following herein, in the preferred case triplicated, a redundant and triplicated clocking structure can be maintained from clocking source to clocking receiver, however, in the receiver end one of the clocks must of course be selected for operational use by the respective equipment.

In previous systems not having redundancy, where clock rate and synch rate are to be distributed to all magazines and cabinets, as a rule two coaxial cable have been used to each receiver or user of the rates, one coaxial cable for the high frequent clock rate and one cable for the low frequency reference rate, that we call also the frame rate or the synch rate herein.

For distribution of clocking rates, where the high frequency clock is distributed separated from the low frequency synch rate, the precision must be great so that for example the pulses in the synch rate will not end up or be interpreted at the wrong one of the edges of the clock rate pulses. This poses among other things great requirements on the similarity of the lengths of the two cables used for clock and synch rate, respectively, in relation to each other and also in relation to other pairs of cables having other destinations in the system.

Distribution of a clock signal which has a very high frequency and by means of which circuits in telecommunication systems presently generally operate, in addition poses large requirements on the shielding of cables and connectors, etc. together with good grounding connections and similar things, so that interference protection and functionality can be provided and also maintained during a long time.

In for example large switches having circuits on circuit boards in magazines and cabinets there is thus a need for distributing a clock having a relatively high frequency and a rate having a lower frequency as a reference for frame structures, etc. Clock rate and synch rate can be distributed in the shape of a single, composite signal ("Composite Clock Signal"), herein called CLSY (CLock and SYnch), as described in the International Patent Application PCT/SE94/00321, which is incorporated herein by reference.

This signal comprises a clock frequency or clock rate that has a frequency considerably lower than the real system frequency at which the circuits of the system operate, i.e. is advantageously an even fraction thereof such as $\frac{1}{36}$ thereof, and it further comprises a synch frequency or synch rate that is modulated on top of this clock frequency and advantageously is an even fraction, such as $\frac{1}{640}$, thereof.

A phase-locked loop circuit, PLL, is provided with logic circuits interpreting the synch information in the composite CLSY signal and it also generates a clock signal having a frequency that is considerably higher than the clock frequency of the CLSY signal, such as for example in a similar way as above, 36 times thereof. The PLL issues the synch pulse with a precision in relation to the system clock that would have been very difficult to produce using conventional clock distribution on two separate lines.

The advantages of distributing a frequency in the shape of CLSY, that has a considerably lower frequency compared to the system clock and in addition is provided with synch information and of arranging for a PLL to generate the system clock rate together with synch rate are:

1. The signal can be distributed more easily from an EMC point of view, i.e. in regard of sensitivity to interference from the outside and in regard of its own interfering influence. The distribution medium must not have the same precision as in the case where system clock and synch rate would have been distributed separately. This implies that for instance a single optocable can be used.

2. Pins and space in connectors and back planes, etc. are saved by using the same physical signal paths for both clock rate and synch rate.

3. A very good precision can be achieved by the arrangement that the PLL generates both the system clock and the synch on the same chip and from the same signal.

Redundant clock distribution systems are disclosed in the documents discussed briefly hereinafter and also in other documents.

In the Japanese Patent Application JP-A 60-225982 clock pulse synchronization is described in a triplicated system. A harmful influence of errors is prevented by correction by means of majority decisions.

In U.S. Pat. No. 4,185,245 an arrangement is described for fault-tolerant clock signal distribution. First and second redundant clock signal sources are arranged. Clock receivers include sequential logic circuits for examining the two clock signals in order to ignore the clock signal pulse train that comes after the other one as to the phases thereof.

U.S. Pat. No. 4,489,412 discloses a network comprising supply of clock and synchronizing signals by means of clock distribution modules that perform majority voting for output signals from three oscillators.

U.S. Pat. No. 4,692,932 is related to triplicated clock distribution, each clock signal including a synchronizing signal. In the receivers R logic circuits for majority voting are included comprising three AND-gates and one NOR-gate in each receiver. These majority circuits pass only the input clock signal that has a phase position located between those of the other two clock signals. No tests are made of the quality of the received clock signals in the receivers in order to make the selection.

In U.S. Pat. No. 4,698,826 triplicated clock distribution is described. Each clock outputs a signal including a clock signal and a synchronizing signal.

U.S. Pat. No. 5,065,454 discloses a clock signal distribution arrangement having redundant clock generation. The distribution paths are duplicated for redundancy reasons.

The European Patent Application EP-A2 0 365 819 treats the problem of synchronizing the individual clocks in a multiprocessor system. A number of clock sources have each one its PLL circuit, see column 10, lines 31–58. The clocks transmit reference signals to each other which are subjected to a selection operation in each clock.

The European Patent Application EP-A2 0 366 326 treats the problem of ensuring, in a computer system in which a number of clock signals are derived from a main oscillator signal, that the clock signals appear at the right times where they are needed. It requires the introduction of a small time delay between the clock signals in order to compensate for differently long transmission paths. The solution described aims at reducing the risk of errors in the time delays of the different clock signals. A PLL circuit is used for maintaining a phase relationship between each clock signal and a reference clock signal.

In U.S. Patent Document U.S. Pat. No. 4,239,982 a fault-tolerant clock system is disclosed that is intended to produce system clock signals by means of several clock sources. Each clock source receives as input signals the clock signals generated from all other clock sources and contains receiver circuits for deriving a system clock signal from these clock sources. Each clock source generates and distributes to the other clock sources a clock signal that is locked in phase to the system clock derived from its clock receiver. The system allows the use of high clock frequencies comprising a minimum phase jitter between derived system clock signals.

In the European Patent Application EP-A2 0 303 916 four rate signals that are synchronous as to frequency and phase are generated, for providing timing for e.g. a computer system. The generation of the rate signals is made by means of four PLLs, the output signals of which are fed to four selector circuits, in which a type of majority voting is performed. The signal selected by a selector circuit is fed back to a definite one of the rate generators for controlling it. Delay circuits are introduced for adapting -the phase position of the selected signals. Such delays cannot easily be introduced in the case where the clock signal contains both a clock and a synchronizing rate, the latter one having a low frequency.

In U.S. Pat. No. 4,105,900 a triplicated control system is disclosed in which three redundant sensor signals are used, one of these signals providing precise information and the remaining two ones less precise information. A selection of signal according to a preprogrammed priority order is based on the operative state of the three sensors.

SUMMARY

It is an object of the invention to provide methods and networks or installations using a clock signal distribution system fulfilling the requirements that can be posed on the clock functions in a switch having a redundant structure, in particular in systems that demand a system clock signal having a high or very high frequency and a synchronizing clock signal having a low frequency.

It is a further object of the invention to provide a redundant clock signal distribution system that allows a simple cascaded communication of clock signals between each subsystem, so that short conductor paths are obtained.

It is a further object of the invention to provide a clock signal distribution system that has a high MTBSF (Mean Time Between System Failure).

It is a further object of the invention to provide a clock signal distribution system in which errors can be detected in an efficient way both in clock signals and in various circuits used for distributing, processing and selecting clock signals.

It is a further object of the invention to provide various methods and devices that in an advantageous way allow an efficient supervision of lines and circuits in a clock signal distribution system.

The problem that is solved by the invention is thus to provide methods and networks/installations and various devices and methods needed therein for an efficient distribution of clock signals to subsystems or subordinate stations, the distribution allowing the signals, lines and circuits. used to be tested for errors all the time.

Redundancy of an electronic system, such as a switch for telecommunication, and of the clock functions thereof, is in the conventional way achieved by triplicating all hardware, i.e. circuits, connection lines, etc. This method of increasing MTBSF thus comprises that several identical units, planes are provided that each one alone can perform the required operation or execute the required processes in parallel. By comparing the output signals from the three planes, a plane having an error can be identified. By excluding that plane that differs from the other ones and having those planes that are similar "decide", a faulty plane can be excluded. This method is called majority voting. In order that a triplicated system based on majority voting is to work it is required that the majority voting works in a meaningful way, i.e. the number of operative planes must be larger than the number of faulty planes. If all the three planes in a triplicated system are correct, the system can be said to work and have a full redundancy. If one of the planes is faulty, the switch can be said to still work but without any redundancy.

What makes the "mean time up to system failure" (MTBSF) for a triplicated system higher, is that it is understood that in the case where one of the planes breaks down, it must be replaced within some rather short time, for example within one week, so that no further error will have time to appear during the critical time when the system has no redundancy. If another one of the planes would break down before the plane first being faulty has been attended to, the system will stop to work completely.

It can be observed that the mean time between errors in a triplicated system is at least three times shorter (=worse) than in a single, non-triplicated, system since it contains at least three times of the amount of hardware compared to the corresponding non-triplicated system. However, still the mean time between system failure, i.e. the time that is to pass before the function of the triplicated system stops, is increased since two faults in two different planes are required simultaneously in order that the function of the triplicated system will cease.

If a plane in a triplicated system stops to work, it is not noticed in the functionality on a system level, since the triplicated system continues to work but without any redundancy. In order that the triplicated system is to obtain an improved MTBSF it is important that all faults are discovered. If a fault arises and if this fault is not detected, it is called a hidden fault. A triplicated system containing hidden faults can work but with a reduced redundancy. A system that can contain hidden faults will have a worse MTBSF.

In order to obtain a high MTBSF it is thus important to arrange for a good fault detection in the system, i.e. that the number of possible hidden faults should be as low as possible. In order to achieve this it is in turn necessary to introduce extra tests in the system, here called maintenance tests. All hardware can break down, also hardware being included in the majority voting. All alarm signals can be non-operative, so that they signal "no alarm", though in reality an alarm situation exists. All signals that are static (=constant or has a constant logical or electrical level) or stationary can be non-operative without this state being noticed.

A reliable indication of the fact whether a plane is faulty or correct is thus something more than the mere presence of a static signal in the hardware. A method used for testing the clock function is that continuously a predetermined number of artificial faults are introduced and that a check is made all the time that the corresponding number of faults has been detected.

To summarize, it can be said that in the redundant system that has a MTBSF that is as high as possible, possible hidden faults are highly reduced and in the system, as described hereinafter, in order to detect possible faults to as large an extent as possible a method is used based on maintenance tests, where thus artificial errors are introduced in the system in order to check whether the system is capable of detecting them. If all artificial faults are detected the system is correct but otherwise, if they are not detected, at least one error exists is in the system.

Generally thus, a clock signal is distributed in an electronic system such as some type of network or electronic installation, for example for processing information, for performing processes in different stations or for communicating information between stations, the clock signal being used for control of various devices, processes, etc. in the system. The clock signal for different subsystems in an electronic system is provided in such a way that the clock signal is delivered or communicated on at least three different, independent lines or channels to such a subsystem. The subsystem performs, as is previously known, a selection of one clock signal among the signals received on the different lines or channels. The original clock signal or the clock signal arriving to a subsystem is always generated independently by this subsystem and thus independently of circuits and processes therein and of the output signals or results therefrom. In the subsystem then, the selection of a clock signal is performed independently and in parallel by or in at least two different, in the normal case three, selection processes working independently of each other, such as in or by at least two different selector units working independently of each other, for producing at least two selected clock signals and in the preferred case three selected outgoing or useful clock signals. The selected clock signals can of course be identical at each time instant, supplied on the same line or channel. These selected clock signals are used in redundant planes in the subsystem and for a cascaded distribution to another subsystem, the construction and operation of which as to the production of such selected clock signals are identical to the subsystem first mentioned. The selected, at least two clock signals, are then allowed to pass to the devices or processes in the subsystem or to another subsystem, essentially unaltered or unaffected by the selection process. This is accomplished by providing the received clock signals to switches in the subsystem where these switches are controlled by the at least two selection processes. When required or desired a change to a new one or another of the received clock signals can be made and this new or another clock is instead passed to the devices or processes or subsystem.

The selection processes work intelligently. They thus evaluate all the received clock signals in regard of their quality or characteristics and determine therefrom the clock signal to be selected by providing a signal to a switch.

The arriving clock signal can advantageously consist of at least three different signals that are delivered or communicated to a subsystem from at least three different clock sources, that each one generates a substantially identical clock signal or a clock signal that has substantially the same timing information. The clock sources can in principle work independently of each other and they can also, in the case where they are the original clock sources in a system, receive common information for establishing the phase position of synchronizing rate information having a low frequency, this information then being included in the clock signal provided by a clock source.

Advantageously the number of different independent processes or selector units for selection of clock signals in a subsystem is equal to the number of independent lines or channels, on which the clock signal arrives to the subsystem, this number preferably being equal to three.

In such a process or in a selector unit, in the selection of a clock signal, all signals can be evaluated that are received from the at least three different lines or channels which arrive to a subsystem, as to faults or errors in the frequencies of the signals and/or in the phase position of a clock signal in relation to the phase position of the other received clock signals. This evaluation is then made independently by or in the different processes or in the different selector units.

For evaluating received signals, faults or errors in each such signal received on the different lines or channels can be determined, the number of errors be counted and further, the number of counted errors in each such clock signal can be evaluated for establishing whether such a clock signal is faulty and/or whether some process or circuit used in generating, transmitting, receiving and also evaluating or selecting a clock signal is faulty. Some error frequency can actually be normal, as will appear hereinafter.

In the case where different clock sources are used or else in transmission devices provided at the independent transmission lines or channels, advantageously intentional errors are introduced in the clock signals and these errors are introduced in such a way that the different processes or selector units for selection of a signal in the subsystem will all the time change to a new selected signal. This presupposes that there exists at least two signals among which the selection is made, i.e. that at least two signals in each moment are judged to be or are determined to have a good quality and then e.g. be as free from errors as required or as possible. An average phase position of the selected and switched signal will then be obtained, that for example will give a reduced phase jump, in the case where one of the signals is determined to be faulty and will not be comprised any longer in the repeated change of a selected signal.

The errors in the clock signals are preferably introduced in such a way that the different selection processes or selector units cyclically and/or in a way regular in time change to a new selected signal. In the latter case it is intended that if for example three signals A, B, C are available a change from A to B is made after a first predetermined time period, a change from B to C after a second predetermined time period and a change from C to A after a third predetermined time period.

Errors that have been,determined in a received signal, can also be evaluated by the method that for example type of detected error and possibly the time of the appearance thereof are stored in some memory means arranged therefor, so that a sequence of such errors will be used in an evaluation algorithm. Such an algorithm could also be executed in a state machine and then no direct memory means are required for storing a sequence of detected errors.

In the case where intentionally introduced errors exist in the clock signals and then changes of selected signal are constantly made in one of the independent processes or selector units, also the number of time when a new clock signal is selected or a switch unit switches to let another clock signal pass can be determined and/or evaluated, or a sequence of such new selections or changes and possibly the times thereof can be evaluated in a similar way as has been described above for evaluating errors detected in the signals.

For among other purposes a simple counting of such changes, in the generation of each clock signal information can be introduced therein indicating the identity of the clock signal and thereby also the identity of the clock source generating the clock signal. Then in a subsystem, in a process for selection of a signal or in a selector unit, the selected signal can be monitored in regard of such identity information, and when such information is detected, the arriving clock signal or the clock source, to which the information belongs or points, is determined. The number of times is counted that information pointing to each individual arriving clock signal is found and such counted numbers are evaluated. Alternatively such information for a sequence of new selections or changes, as related to a received clock signal or to a clock source can be evaluated in a way similar to that described above with reference to evaluation of errors. Also the times when the information has been determined can like above be used in such an evaluation.

In the introduction of intentional errors or of identity information it is naturally assumed that each received clock signal is generated as a sequence of pulses from which timing information can be derived. Such a pulse sequence will then substantially agree with a pulse sequence chosen as a main template, for example of the composite clock signal type described in the International Patent Application PCT/SE94/00321 cited above. Such a pulse sequence contains a regular sequence of pulses interrupted by especially designed but identical short sections forming the synchronizing rate pulse. The main template pulse train can naturally have a different design, such as consisting of a repeated sequence of one or more pulse bursts having a constant level therebetween and/or therebefore and/or thereafter. Generally each pulse comprises in the conventional way a first transition from a first level to a second level and a second transition from the second level to the first level, so that the template pulse train will comprise a sequence or train of such transitions.

For introducing identity information in such a clock signal the clock signal is generated so that it agrees with the main template pulse train but within at least one predetermined section, within which the clock signal instead agrees with an identity template pulse train, which corresponds to a deformed section of the main template pulse train.

In the case where all of the main template pulse train is periodic, what naturally is the normal case, it thus comprises a fixed template pulse subtrain repeated with a definite time period. The clock signal is then generated advantageously so that the predetermined section that has a lacking agreement with the main template pulse train has a fixed position in time within each period of the main template pulse train.

In the introduction of identity information the clock signal can also be generated so that it coincides with the main template pulse train except that at least one pulse having a predetermined position in the main template pulse train is omitted, in particular having a predetermined position and then a fixed time position in a periodically repeated template pulse subtrain.

For introducing identity information the clock signal can further be generated so that it agrees with the main template pulse train except that at least one transition having a predetermined position in the main template pulse train is changed, in particular that a transition having a predetermined position is omitted and that a transition of a kind opposite to the omitted transition and having a predetermined position is changed to the kind to which the omitted transition belongs.

For intentionally introducing a frequency error a clock signal can be generated so that it agrees with the main template pulse train except that a first predetermined number of successive pulses are omitted. In order to intentionally introduce or imitate a phase fault in the corresponding way a clock signal can be generated so that it agrees with the main template pulse train except that a second predetermined number of successive pulses are omitted. The second predetermined number should then be greater than the first pre25 determined number, so that an intentionally introduced phase error is also a frequency error and thus when detecting an error and determining that it is a phase error, this error will be determined to also be a frequency error.

However, a correct determination of the kind of encountered error can still be made, owing to that a detected frequency error will not necessarily be determined to be a phase error.

In detecting errors in clock signals as considered in relation to each other and in particular in determining whether timing pulses have timing errors in relation to each other, naturally in a known way a simple AND-gate can be used for an indication of the time position. However, it will provide a rough estimation and instead, in order to obtain a determination the accuracy of which easily can be set, a method can be used utilizing a fixed pulse signal having pulses of a frequency that is considerably higher than the frequency of the timing pulses in the clock signals. By means of the high frequency signal from each timing pulse an evaluation pulse is formed that starts at the same time as the timing pulse but has an end that is determined by the start of a pulse in the fixed pulse signal, so that the evaluation pulse will have a length forming a predetermined number of periods of the fixed pulse signal and a fraction of such a period. Then, an AND-operation is made on the evaluation pulses thus produced, i.e. an intersection pulse is produced being constituted by the intersection of the evaluation pulses. An alarm signal signifying a timing error between the clock signals is then provided when the intersection is empty, i.e. in the case where the intersection pulse is not there.

Such a detection can ;Iso be made to include hysteresis. By means of the fixed pulse signal having a high frequency in the same way, from each timing pulse a first evaluation pulse is formed that starts at the same time as the timing pulse but has an end that is determined of the start of a pulse in the fixed pulse signal, so that the first evaluation pulse will have a length constituting a first predetermined number of periods of the fixed pulse signal and a fraction of such a period. In the corresponding way a second evaluation pulse is formed that has a length constituting a second predetermined number of periods of the fixed pulse signal and a fraction of such a period. The second predetermined number is not equal to the first predetermined number but is preferably greater than it. First and second intersection pulses are produced from the intersection of the first and the second evaluation pulses, respectively. The time intervals between the appearance of, i.e. for example the start of, the first intersection pulses are monitored and a first signal is provided in the case where this time interval is larger than a threshold value. The time intervals between the appearances of the second intersection pulses are similarly monitored and a second signal is provided in the case where this time interval is larger than the same threshold value. An alarm signal signifying a timing error between the clock signals will then not be produced until the second signal appears and the production of this alarm signal will not end until a transition of the first signal that is such that this signal continues from an existent state to a non-existent state. This will give a hysteresis of a magnitude corresponding to the difference of the second and first predetermined numbers of pulses.

In the composite clock signal there is, as has been mentioned above, a base band clock having a base frequency comprising in principle, substantially regularly repeated similar pulses and signal sequences, that among other things indicate a synch pulse and that correspond to deformed short sections of the base band clock. In the detection of a synch pulse or a synch pattern a pulse is obtained as an output signal that has not a completely definite time position in relation to such an encountered pattern, owing to tolerances of the electronic components used. Then a pulse in the base band clock can be extracted and isolated at a definite distance in-time from the synch pattern, what is made in the following manner. A signal sequence such as a synch pattern is thus detected by some suitable detector that is arranged to generate a first pulse. This pulse will naturally appear after the detection of a signal sequence and it will have a suitably, accurately chosen position in time that is generally easy to accomplish using conventional components. The time position must be such that a definite transition in the first pulse, for example its first edge is always situated within a time interval that is shorter than a space between pulses in the base band clock signal of the clock pulse signal. From the first pulse, in a delay and pulse shaping circuit a second pulse is produced starting after the other pulse having a predetermined delay and having a length that is shorter than one period time of the base band clock of the clock pulse signal, so that the second pulse will appear in time at the same time as the whole time length of a complete clock pulse of the base frequency in the clock pulse signal. Finally, in an AND-gate the intersection of the second pulse and the clock pulse signal is formed, whereby, on an output terminal of the gate, the whole clock pulse will be provided as one isolated pulse.

In the detection of a signal sequence a detector can be used that includes a source of an auxiliary clock pulse signal having generally a considerably higher frequency than the clock pulse signal. The source can work independently of the clock pulse signal and provide pulses having a frequency, say 4 to 10 times of the base band frequency thereof. The clock pulse signal is sampled by means of the auxiliary clock pulse signal and the pattern of the sampled signal is evaluated by a comparison to one or several predetermined patterns, and at agreement the first pulse is produced.

For the sampling a shift register can be used and the high frequency pulse signal is then provided to the clock input terminal of the shift register. To the shift input terminal thereof the clock pulse signal is delivered. The shift positions of the shift register are connected to a suitable combinatorial network so that the first pulse is obtained on the output terminal of the network. The magnitude of the shift register must be chosen based on the length of the signal sequence and the ratio of the frequency of the pulse signal generated by the source and the base band frequency of the clock pulse signal. The frequency of the auxiliary clock signal should not be too high, since a too high frequency will imply that a large shift register must be used and that the combinatorial network will be large and complicated. A too low frequency of the auxiliary clock signal can provide a too bad signal pattern recognition.

BRIEF DESCRIPTION OF THE DRAWINGS

The invention will now be described as a non-limiting exemplary embodiment with reference to Accompanying drawings in which FIG. 5b is a wave form diagram of a section of a composite clock signal containing a synch sequence,.

FIGS. 5c–5e are wave form diagrams of output signals from various circuits illustrating how an isolation of a synch pulse is made, FIG. 6b is a block diagram of a differentiation circuit used in the phase error detector, FIGS. 6c–6e are wave form diagrams illustrating the signal processing in the differentiation circuit, FIG. 6f is a block diagram of a coincidence detector used in the phase error detector, FIGS. 6g–i are wave form diagrams illustrating the signal processing in the coincidence detector, FIG. 7b is a truth table of a combinatorial circuit used in the clock selector control, FIG. 7c is a state diagram of a state machine used in the clock selector control, FIG .8 is a schematic block diagram of a unit for selecting a clock signal and for producing a system clock and a synch rate.

DETAILED DESCRIPTION

Figure 1:
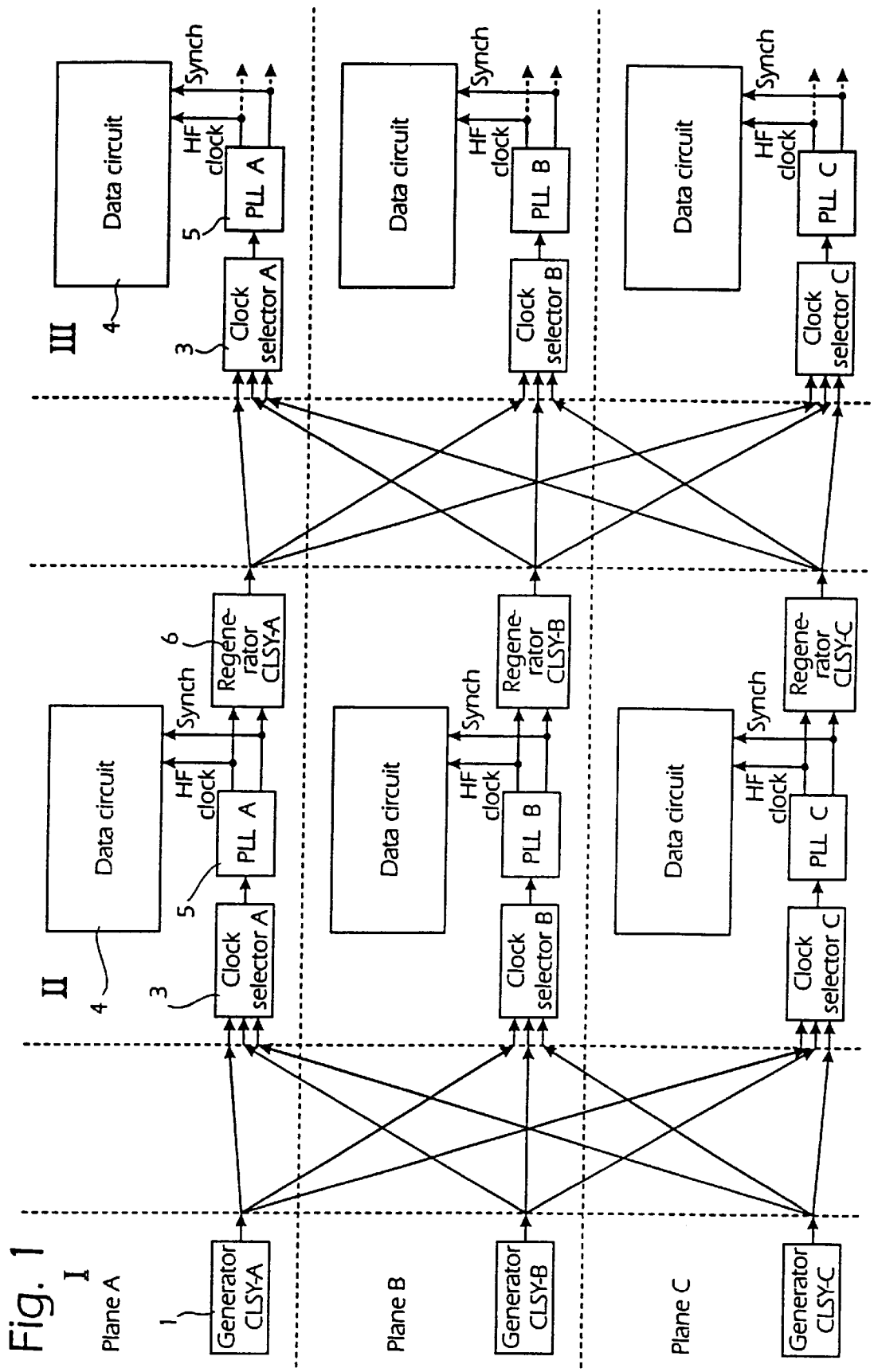
FIG. 1 is a block diagram of a clock distribution system.

The following detailed description is based on a clocking signal called CLSY (CLock and SYnch signal), see the discussion above and the International Patent Application PCT/SE94/00321 mentioned above.

The CLSY signal is a composite clock signal that is composed of a clock signal "clock" which hereinafter is assumed to be chosen to 5.12 MHz and is a pulse signal, typically a square wave signal, having a frequency that is here called the base frequency or the base band frequency, and a synchronizing signal "synch " having a frequency that hereinafter is assumed to be chosen to 8 kHz. The clock frequency that is supposed to be used in the system of the different "useful components " thereof is 184.32 MHz and is also called the frequency of the system bit clock or the frequency of the system clock, but in order to be able to distribute more easily clock rates in the system the clock rate is distributed in this way having a lower frequency, the base band frequency in order to be, on the receiver side, i.e. in each unit that needs a system rate, multiplied by a factor of 36 in a PLL, a phase-locked loop circuit, in order to obtain the desired system clock of 184.32 MHz. The PLL also decodes the synchronizing signal that is included in the CLSY signal. The PLL has also the quality of being insensitive to the cases where single pulses in the input signal are omitted or where there are single spikes in the input signal.

Inside the CLSY signals codes for maintenance testing are also provided. These codes or patterns supply information in regard of the plane in which a considered CLSY signal is generated and further, they emulate certain errors for maintenance testing the hardware.

There are several advantages of the CLSY signal, as has been indicated above: phase differences between clock rate and synch rate are reduced, the number of physical signal conductors is reduced and "phase jumps " will have magnitudes of at most ¼ of the period of the synch and clock rate respectively, i.e. of the periods corresponding to the frequencies of 8 kHz and 5.12 MHz respectively.

The logical architecture of the generation, distribution and termination of the clock and synch signal will first be described at a general level. In FIG. I it is shown in principle, how three generators 1 create the composite clock signals, the CLSY signals, i.e. three equivalent composite signals here called CLSY-A, CLSY-B, CLSY-C, that contain both a clock rate and a synch rate. These composite clock signals are distributed from each generator 1 to each one of three clock selectors 3 that terminate the triplicated distribution. In each such clock selector 3 an independent choice is made, independent of the other two clock selectors, of the "best" clock signal By evaluating the different received clock signals and comparisons thereof. Thereafter the selected CISY signal passes from each clock selector 3 to a following phase-locked loop circuit 5, PLL, in order to be separated there in its components, the clock rate and the synch rate, respectively, and for generating a system bit clock. The system bit clock and the synch rate are used in each plane by various electronic circuits that are schematically illustrated by the triplicated data circuit 4 in FIG. 1.

Each one of the oscillators 1 is constructed so that it creates a composite clock signal, a CLSY signal, containing pulses or pulse patterns for definition of clock rate and synch rate and further also sequences of pulses or changed or modified pulses that imitate errors, for maintenance testing following clock selectors 3, and also, hidden in the pattern of pulses for clock rate and synch rate, by the method that some pulses have been changed, an identity code comprising information on the plane in which the considered CLSY signal has been generated, i.e. whether it has been generated by the oscillator in plane A, B or C. "Artificial errors" in the CLSY signal are created by the method that a CLSY generator I introduces the errors in the composite clock signal already from the beginning, so that the errors constitute a natural part of the CLSY signal. By this method it will not be possible to remove or add artificial errors on command.

The task for a clock selector 3 is to autonomously select a working composite clock signal among the three arriving clock signals CLSY-A, CLSY-B, CLSY-C. Criteria of the fact that a CLSY signal is to be considered as correct is that its frequency is correct and that its phase position in relation to the two other CLSY signals is to be located within certain limits. The clock selector 3 thus makes an autonomous judgement of the frequency and the phase position in relation to each other of the arriving clock signals and selects according to an algorithm one of the input signals, which is communicated to the output terminal of the clock selector 3 through a multiplexer in the clock selector 3. The clock selector is thus maintenance tested by means of artificial errors which are always included in the CLSY signals. Further, the artificial errors are entered so that the clock selector 3 will run through all accepted clock signals and in particular so that it periodically and in a pattern that is regular in time changes cyclically between them. In this way it is constantly verified that it is possible for a clock selector 3 to actually select anyone of all accepted composite clock signals. By using this method no signals are to be provided that are outside the functional clock distribution, but the signals needed for the maintenance testing are always incorporated as a part of the functional clock signal.

The function of a PLL 5 is, as has been mentioned above, to separate the arriving CLSY signal in its components, signals for clock and synch rate respectively, to multiply the extracted clock frequency to the system bit frequency of 184.32 MHz, to filter out ID-codes and emulated, i.e. intentionally introduced, error patterns, to convert abrupt phase jumps to slow phase drifts and to filter jitter that can exist in the input signal to the PLL 5.

In order to obtain a high MTBSF (Mean Time Between System Failure) for the circuits and connections in the system, it is important that as many as possible of the possible errors that can arise in the hardware can be safely detected. It is also important that a possibility exists of localizing an error as well as it is important that no errors are propagated through the system and thereby give the system worse characteristics.

In order to obtain this, it is naturally important that the maintenance functions are as reliable as possible. Further, if a hardware error would appear in the very maintenance functions, this should also be possible to detect wherever the error has arisen. Similarly, the design of the system should not be such that an error actually has arisen in some part that influences the main task of the system and that the maintenance functions are not capable of detecting this error owing to some error in the maintenance functions or some other error or owing to an imperfect construction.

To use a single static hardware signal, that informs on alarm state, thus "OK" or "not OK", must be considered as unreliable, as has been mentioned above. A hardware error can have arisen in the hardware communicating the signal, so that the information of the signal is erroneous. It can indicate "error" even if it is "OK", or indicate "OK" in spite of being "error".

In the design of maintenance systems for clock functions the principle is used that at least two different signals in the hardware are to be supervised by software and the criterion of the fact that the system is to be judged correct should be that there must exist a certain relation between these hardware signals and further, that the hardware signals should not be static, but that they instead should be constituted by either counters or flags, which change according to a predetermined pattern, for example such as that a certain flag is set at some occasion and then is reset at another occasion. The software should then require that the expected dynamics, i.e. the serial order in which the flag is set and reset respectively, exists all the time and that otherwise an alarm signal is generated in the software.

The function of a clock selector 3 is according to the discussion above mainly both to select away, at each time instance, a badly working clock and to select among the remaining correct clock signals a working clock signal CLSY-A, CLSY-B or CLSY-C. In order to check whether a clock selector 3 is working, that clock signal which at a considered time instant is selected by the considered clock selector 3, is deteriorated by the permanently and intentionally introduced errors, and supervising functions check that the clock selector 3 then is capable of selecting another composite clock signal.

The clock signals, the CLSY signals, are therefor, as has been indicated above, made to contain, already from the start, pulse sequences which imitate defective clock signals. The CLSY signals are generated in the construction blocks that are called CLSY generators 1 in FIG. 1. The artificial errors which are found in a CLSY signal are further entered so that they correspond to criteria that define the clock qualities which the clock selector is to accept or not accept, respectively.

From a clock selector 3 the selected CLSY signal is provided and in order to be able to decide if it is that CLSY signal that the system should select or think that it has selected, the CLSY signals have, according to the discussion above, also been provided with identity codes, ID-codes, during the generation of the signal. The CLSY signal that is generated in the A plane, is thus called CLSY-A and is provided with an identity code A, indicating that the CLSY signal has its origin in the A plane. In the corresponding way the CLSY signal from the B plane is provided with an ID-B code and the CLSY signal from the C plane with a code for C. By monitoring the CLSY signal provided from a clock selector 3 superior functions in the system can determine the identity of the CLSY signal that has been selected.

Figure 2:
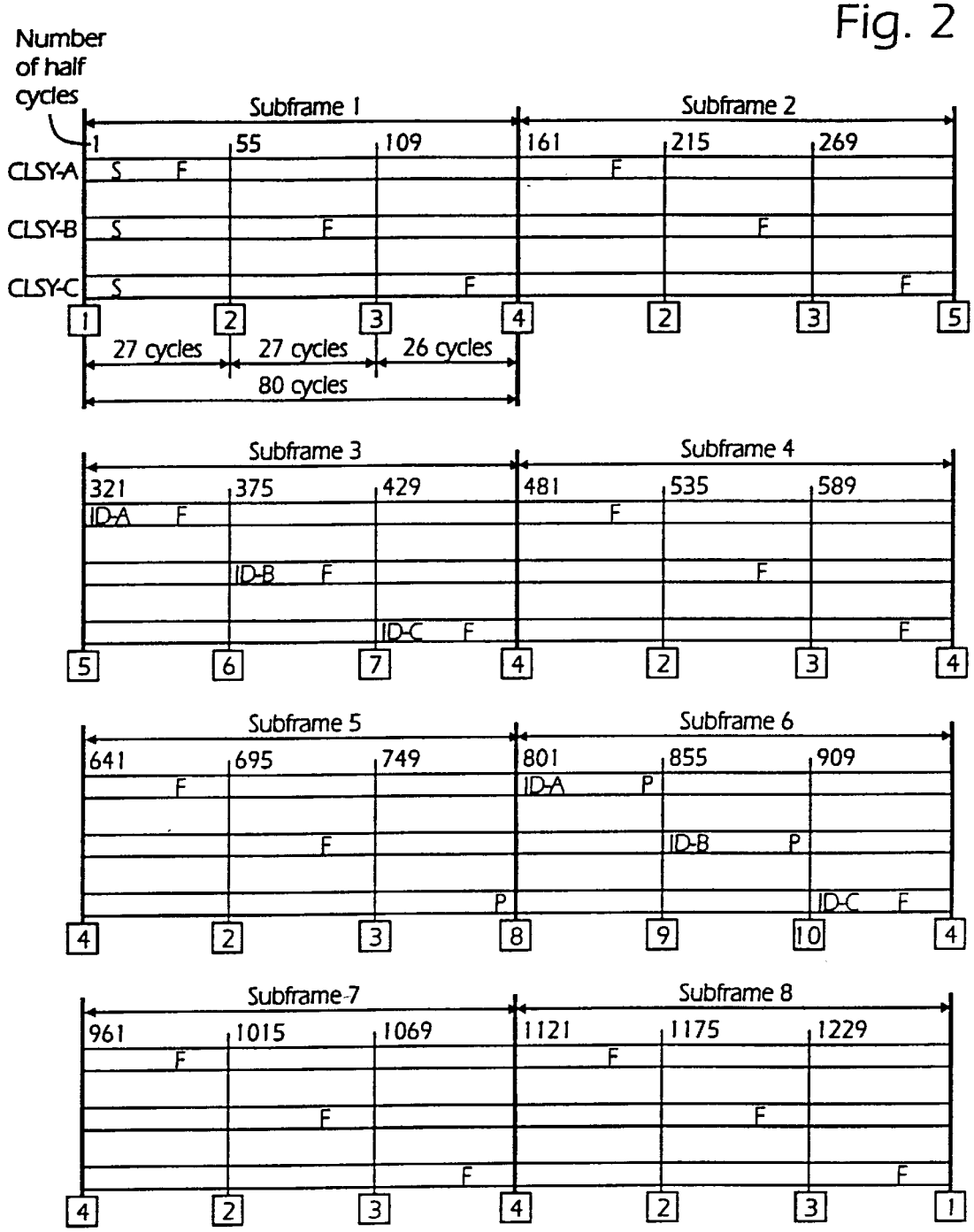
FIG. 2 is diagram illustrating the structure of a frame in a clock signal, FIG. 3 are wave form diagrams as functions of time that illustrate various subsequences of the clock signal frame.

A CLSY signal is divided into frames which each one has a length of 125 microseconds, i.e. the frames are repeated with the frequency 8 kHz which is the same as the synch rate, and they comprise 640 cycles or periods of the clock rate signal of 5.12 MHz. Further each pulse or period of the clock rate signal can be considered as two halfperiods, where a transition, positive or negative, can occur, and using this way of looking then 1280 data bits exist in each CLSY frame. These bits are numbered from 1 up to 1280 as is shown in FIG. 2. A CLSY frame is divided into 8 subframes and each subframe is divided into three subsections, the first and second subsections of which each one has a length of 54 bits and the third subsection of which has a length of 52 bits.

In the beginning of each CLSY frame a pattern is provided for frame recognition and this pattern is called a synchronization pattern or synchronization sequence that indicates a synch pulse. It is this pattern that a PLL 5 recognizes and each time that this pattern is recognized by a PLL 5, the PLL 5 generates a corresponding synchronization pulse. This synchronization pattern increments, for each time that it appears on the output of the multiplexer of the clock selector, a counter for synchronization patterns as will be described hereinafter.

In each CLSY frame two ID-codes are arranged, naturally denoting the same plane. In the CLSY signal generated in the A plane two ID-codes for A are provided. The corresponding condition applies to CLSY signals generated in the B and C planes.

In FIG. 3 subsequences of the CLSY frame that are schematically illustrated in FIG. 2 are shown as wave form diagrams. The numbers within squares in these figures correspond to each other. In the CLSY signals particular bit sequences or pulse sections of the pulses in the base band frequency are arranged that indicate synchronization pulses S for each frame, frequency reject sequences F, phase reject frequencies P and identity codes ID-A, ID-B, ID-C. Each frame thus starts with a synchronization sequence S. Within each subsection of a frame there is an intentionally introduced error sequence F or P for simulating frequency errors and phase errors respectively in a single one of the three clock signals. The distance from a frequency reject sequence F to the following border between two subsections in the frame is always constant. The distance from a phase reject sequence to the most nearly located, following border between subsections is also constant but has a value which is different from the distance that applies to the frequency reject sequences and which in particular is less than it. The ID-codes ID-A, ID-B, ID-C always follow directly after a border between two subsections, i.e. they arrive first or early in a subsection, before the error sequence therein. The error sequences F or P always follow in the later part of a sub-section, so that in a subsection there is room for both an identity code and an intentionally entered error sequence.

The frequency reject sequences F consist of the device that two pulses in the base frequency have been omitted and that during them a smooth low voltage level exists and in the same way the phase reject sequences P consist of the device that three pulses in the base band frequency have been omitted, i.e. they are one pulse longer. The phase reject sequences P occur in each clock rate frame only once in each clock signal, i.e. in only one subsection. In other subsections there is a frequency reject sequence F in only one of the composite clock signals. Identity code sequences ID-A, ID-B, ID-C occur twice in each frame and each individual clock signal. They consist of the device that two pulses are omitted having a different number of remaining pulses therebetween, in particular one, two or three remaining pulses for the identity code sequences ID-A, ID-B and ID-C respectively.

Using the preferred arrangement, which will be described in greater detail hereinafter, a clock signal selector 3 that works correctly will select CLSY-A as an output signal during the first subsection in each subframe, it will select CLSY-B during the second subsection in each subframe and CLSY-C during the third subsection in each subframe. A new selection of clock signal will then thus be performed at each vertical, thin or thick, line in FIG. 2. There will always be time to perform this, before the next intentionally entered error sequence is detected and also before encountering an ID-code.

A clock selector 3 comprises, as has been mentioned above, a multiplexer and it has three input terminals and one output terminal and one address input terminal controlling the multiplexer, see the detailed description hereinafter. The control address is generated autonomously in control logic circuits in the clock selector that sense quality, phase position and frequency of the three arriving CLSY signals and from these measurements and certain other criteria, as given by an internal state machine, determine the clock that is to be selected and is to be provided from the selector. On the output side of the multiplexer a device is provided recording ID-codes. Alternatively the ID-code of the selected composite clock signal can be obtained directly from the control logic circuits. For each ID-code A that is detected on the output terminal of the multiplexer, a counter for ID-A pulses is incremented. The corresponding counters are provided for ID-B and ID-C. In addition to counters for IDcodes also, as has been mentioned above, a counter is provided for the number of detected synch patterns, where each synch pattern defines a clocking pulse for the synchronization rate.

Also on the input side of the multiplexer an arrangement is provided comprising ID-code counters that will be described hereinafter. On the input of the multiplexer where the clock signal CLSY-A from the generator A is expected to arrive, a device is provided sensing ID-A pulses and for each pulse a counter is stepped. At the input terminals of the other clock signals CLSY-B and CLSY-C of the clock selector or multiplexer corresponding counters for ID-B pulses and ID-C pulses are provided.

The principle of verifying that the clock selector works is that the software reads the number of counted ID-codes and checks that the counted numbers of ID-pulses A, B and C on the input side of the multiplexer agree with the number of counted ID-pulses and synch pulses on the output side of the multiplexer. In order that the counted pulses are to correspond to one and the same period, all counters are reset simultaneously at a certain time and before the count values are read, the incrementing thereof is simultaneously stopped.

Software is arranged taking care of the maintenance functions. This software reads at certain intervals the counter values. After all counters have been read, they are reset and before they are read, their counter values are frozen simultaneously according to the discussion above so that they are not updated any further. Thereby all counter values will correspond to one and the same time period.

In order to explain the number of counted pulses or, more exactly, the relation which is to exist between different counter values that have been recorded by the counters in a clock selector 3, for a correct function, it will first be described in greater detail the way in which the CLSY signals are constructed. It should be observed that the PLL 5 that is provided after a clock selector 3 is insensitive to both ID-codes and artificial error sequences, emulated errors, by the fact that it can only change relatively slowly. It can also be observed, that the triplicated distribution of clock signals in to a clock selector after the clock selector is no longer triplicated. Neither is the PLL 5 triplicated in the respective plane, but in contrast there is a PLL 5 in each plane, so in this way also the PLL is triplicated. If any of the PLLs breaks down, it is observed by the fact that the whole plane goes faulty. It is not necessary to supply maintenance checks of a PLL 5, since an error in a PLL 5 is visible. In the system erroneous PLLs 5 cannot exist without being observed. An error in a clock selector 3 would in contrast exist if special maintenance functions for the detection thereof were not provided. For example it could be so that the clock selectors in the A plane and the B plane owing to some fault cannot select any other clock than for example A. The system will then work well as long as the clock A exists and is correct, although the redundancy does not work in the intended way. Then it is enough that an error arises in the CLSY generator 1 in the A plane in order that the whole system will stop to work. It is thus important to provide reliable maintenance functions in the clock selector 3 in order to ensure that no errors exist there.

The CLSY signals and the functions in the clock selector 3 are adapted to each other in order that cycling between clock signals and maintenance testing will be provided. In particular the clock selectors 3 are designed for excluding signals having phase errors and/or frequency errors. Knowing how the detectors for the phase and/or frequency errors are made, particular patterns can be entered in the CLSY signal which make that the detectors in the clock selector for phase and frequency errors, respectively, are used all the time.

The phase monitoring is made in the following way: The phase position between each pair of CLSY signals, i.e. between A and B, between B and C and between C and A, is checked by the method that the edges are not allowed to be separated in phase (="skewed") by more than a certain number of nanoseconds, "the phase acceptance window", which for example can be set to about 44 to 49 nanoseconds, what will be discussed in greater detail hereinafter. The positive edges in each CLSY signal are converted to a pulse having a definite duration that is equal to the width of the phase acceptance window. These pulses are called differentiation pulses. The differentiation pulses from the two planes that are to be compared in regard of phase, are connected to an AND-gate. If the two CLSY signals are separated in phase by more than the width of the differentiation pulses, there will be no logical one as output signal,.from the AND-gate. However, if the signals are in phase or are not separated by more than the width of the phase acceptance window, a logically true signal will be generated as output signal from the AND-gate, since both of the differentiation pulses are logically true during a time period. The signal generated in that way as output signal from the AND-gate is called a coincidence pulse. Knowing that in a normally working system the CLSY signals are not separated as to their phases by more than the width of the phase acceptance window, i.e. that all differentiation pulses will result in a corresponding coincidence pulse, and the differentiation pulses, that are generated from the positive edges in the respective CLSY signal, have a periodicity of at most about 600 nanoseconds, the result will be that the time period between coincidence pulses will agree with the time period between simultaneous positive transitions or transitions, i.e. at the longest about 600 nanoseconds. The time period between the coincidence pulses is monitored and constitutes a measure whether the two CLSY signals are in phase with each other: In the case where the time period is below 650 nanoseconds, the signals are said to be in phase with each other. In the case where the time period is above 650 nanoseconds, at least two differentiation pulses have not arrived sufficiently simultaneously (not with a sufficient overlap), are thus separated by more than the width of the phase acceptance window and are thus not in phase with each other.

In order to verify whether the phase supervision works, a suitable number of positive transitions in the CLSY signal can be removed. Then will, in the case where the phase monitoring logical circuits work, a corresponding phase alarm be generated and a change of clock is made in the clock selector 3.

If a phase error exists, a real or "genuine " one or one produced by manipulating the CLSY signal, for example in CLSY-A, the phase monitoring logic circuits will observe a phase error of the clock signal A and the clock signal B in relation to each other and of the clock signals C and A in relation to each, but not of the clock signals B and C in relation to each other. By means of decoding the information from the phase monitoring logical circuits in a combinatorial way a conclusion can be made in regard of the plane that has a phase error, in the case where a plane would have one.

When and if a plane, that is selected by a clock selector 3, has been noticed to be faulty, a selection of another plane is to be made. Which one of the two remaining working planes that is to be selected is defined in a state machine in the clock selector 3, see below. If the clock signal A is selected and in the case where A becomes faulty, clock signal B is selected. If clock signal B is selected and B stops working correctly, clock signal C is selected. If the composite clock signal C is selected and stops working, clock signal A is selected. If a clock signal is selected and any of the other clocks stops working, no reselection is made. In the case where a considered clock signal has been selected owing to that another clock signal stopped working and in the case where this clock signal then again starts working, the clock selector 3 remains with the latest selected clock signal and does not return. For example, if thus clock signal A is selected and stops working correctly, clock signal B is selected. If then the clock signal A becomes correct again, the clock selector 3 still has the clock signal B.

By removing a certain,number of positive transitions (=edges) from a selected CLSY signal, thus a clock selector 3 will judge that this signal is faulty and deselect this signal and instead select the clock signal that is in turn according to the state machine. The intentional sequences in the CLSY signals that trigger the error detectors and thus emulate various faults are here called reject codes.

By entering such reject codes in the CLSY signals at different positions a clock selector 3 can be made to cyclically select the different clock signals CLSY-A, CLSY-B and CLSY-C in a circulating serial order. By entering ID-codes in the CLSY signal to which the change is made, at predetermined positions in the CLSY signal, which comes immediately after the time when a change is to be made, the system can verify, by reading the counters for ID-codes, that all error detectors work. If anyone of the error detectors does not work, the change will not be made to the CLSY signal being the next one, so that the corresponding ID-code will not be recorded by the intended counter. On the other hand, if an error detector has broken down in such a way that it generates an alarm all the time, also then an incorrect number of ID-pulses will be counted. A diagnosis of the cause of the error can be made by a suitably designed decoding table, to which the inputs are constituted of the number of recorded ID-codes.

In addition to phase errors also frequency errors are monitored. The frequency of the three arriving CLSY signals is supervised by comparing to a locally generated chronometer rate. There is thus no relative comparison between the signals, such as is the case for the phase monitoring, but a check of the frequency of each incoming signal in relation to a chronometer rate.

In each clock selector 3 a frequency monitoring unit is provided for each arriving CLSY signal and this monitoring unit can provide a corresponding frequency alarm for each CLSY signal. The frequency monitoring is made in the following way: if the CLSY signal has a too long period, an alarm is generated. The alarm limit can be set to for example 400 nanoseconds.

In order to verify that the frequency monitoring works, a suitable number of cycles in a CLSY signal can be replaced by a constant (voltage) level, so that the criterion "time period longer than 400 nanoseconds " is fulfilled. Such a sequence emulating a frequency error is called a frequency reject code and a sequence emulating phase errors being is called a phase reject code.

The information in regard of frequency errors in the clock selector 3 is put together with the information in regard of phase errors in a combinatorial table, see FIG. 7b. An output signal from the table indicates those CLSY signals which are defective and those which are correct. This information together with the state machine for clock selection decides the clock to be selected. Output signals from the state machine are communicated to the address input terminal of the multiplexer and control in that way the clock to be chosen.

By entering, as has been described above, frequency reject codes in the CLSY signals at various positions a clock selector 3 can be made to cyclically select CLSY-A, CLSY-B and CLSY-C in a circulating serial order, where thus a change is always made at a transition to the next subsection of the[]selected clock signal. By arranging two identity codes in each frame, the number of encountered codes can be counted in the selected clock signal and thereby it can be checked that the error detectors work. By entering an ID-code in the CLSY signal, to which a change is made after detecting a phase error sequence, so that it can be sensed immediately after the change has been made in this case, the system can verify, by reading the counters for ID codes, that all phase detectors work. In the case where a phase error detector does not work, a change will not be made from a selected clock signal, when an intentionally introduced phase error exists in the clock signal. This results in that the ID-code of the subsequent signal in the cyclical sequence ABCABCA . . . will not be recorded and counted. The corresponding condition applies to frequency errors. Normally, as an average for each frame ID-codes will be counted twice for each clock signal CLSY-A, CLSY-B, CLSY-C.

The frequency reject pulse is about 500 nanoseconds long. The phase reject pulse is about 700 nanoseconds long. The frequency reject pulses do not trigger the phase detectors but the phase reject pulses trigger the frequency detectors. In order that it should be meaningful to read the ID-codes after a phase reject pulse it must be guaranteed that the phase detectors and not the frequency detectors have caused the change of clock.

The method therefor is to arrange that a clock change caused by the phase detectors is made much more rapidly (=earlier) than a change caused by the frequency detectors, and that the ID-ode associated with the phase reject pulse or phase reject code is placed directly after the time of the phase reject pulse. The ID-code is provided in that CLSY signal to which the change is made, what appears from FIG. 2, see those sections which are denoted by FIGS. 8, 9 and 10 within squares.

If a phase reject pulse is entered in CLSY-A, the clock selector 3 will, as soon as the phase detectors therein have detected the (artificial) phase error, select clock signal B. If now clock signal B has been chosen and an ID-B exists in CLSY-B, then ID-B will be visible on the output terminal of the multiplexer in the clock selector and there it can be counted.

If a phase reject pulse is entered in CLSY-A, but the phase detectors are faulty, the frequency detectors in the clock selector 3 will cause, but not until after a delay time, a change of clock from clock signal A to clock signal B. Now if clock signal B has been selected and an ID-B exists in CLSY-B, though this ID-B is placed immediately in time after the phase reject pulse, ID-B will not be visible on the output terminal of the multiplexer, since the change to CLSY-B is delayed owing to that it has been caused by the frequency detectors. Suitable delays can be chosen based on the detailed wave form diagrams of FIG. 3, see in particular the diagrams at the squares containing 1 and 8. A selection of clock signal is made at the border between to subsections, for example at a time corresponding to one or two pulses from such a border. This means that the selection is made almost immediately after a phase error P by considering the clock signals which have been without errors during the most proximate time period, in particular within the considered subsection. If the delay mentioned above when detecting a frequency error is at least, say 4 to 5 periods of the clock rate, an intentionally introduced phase error, that has only been detected by frequency detectors, will not be included in the selection of a new clock signal at the subsection border but a consideration thereof is not made until at the next border.

In this way it is thus possible to make a maintenance test of the phase detectors only, by means of the phase reject pulses, without having the test damaged by interference of the frequency detectors, and it is also possible to make a maintenance test of the frequency detectors only, by means of the frequency reject pulses, without causing that the phase detectors provide alarm signals because of that reason.

In each CLSY frame one phase reject pulse and seven frequency reject pulses are arranged. It means that the clock selector runs through the sequence A-B-C eight times within one CLSY frame, i.e. that the sequence A-B-C is run through with a frequency of 64 kHz. An advantage of this rather high frequency is that if the three clock signals arriving to the clock selector are a little out of phase in relation to each other, owing to component spreads, the CLSY signal phase step modulated immediately after the clock selector will be smoothed or evened by the PLL 5 that has a relatively low limit frequency. The PLL 5 reduces the phase jitter that is introduced by the maintenance tests comprising the associated clock selector 3 changes all the time the selected clock signal with such a high frequency.

The clock system also allows that units are connected in cascade. In the first stage I the clock signals are always generated by generators 1, see FIG. 1. In the next stage II, for each plane, a clock signal is selected by means of clock selectors 3 among the clock signals generated by the sources 1 and therefrom is produced or extracted, respectively, the high frequency clock signal or system bit clock and the synch signal by means of PLLs 5. These two retrieved simple clock signals are delivered to clock regenerators 6 that can be located in this stage II, or possibly in the next following stage III. In these regenerators 6 again composite clock signals are formed by introducing synch patterns, identity codes, frequency and phase reject sequences. These new clock signals are then communicated to clock selectors in the next stage III, etc. An advantage that is valuable particularly in cascading several clock systems is that in each plane in each stage an average formation of the phase positions of the clock signals is made from the planes in the previous stage by means of the clock selector 3 and the PLL 5, i.e. that in each plane in a stage an average formation is made of the clock signals from the same three planes in a previous stage, resulting in that possible phase differences for the clock signals of the planes in the previous stage are evened out or smoothed.

Figure 4:
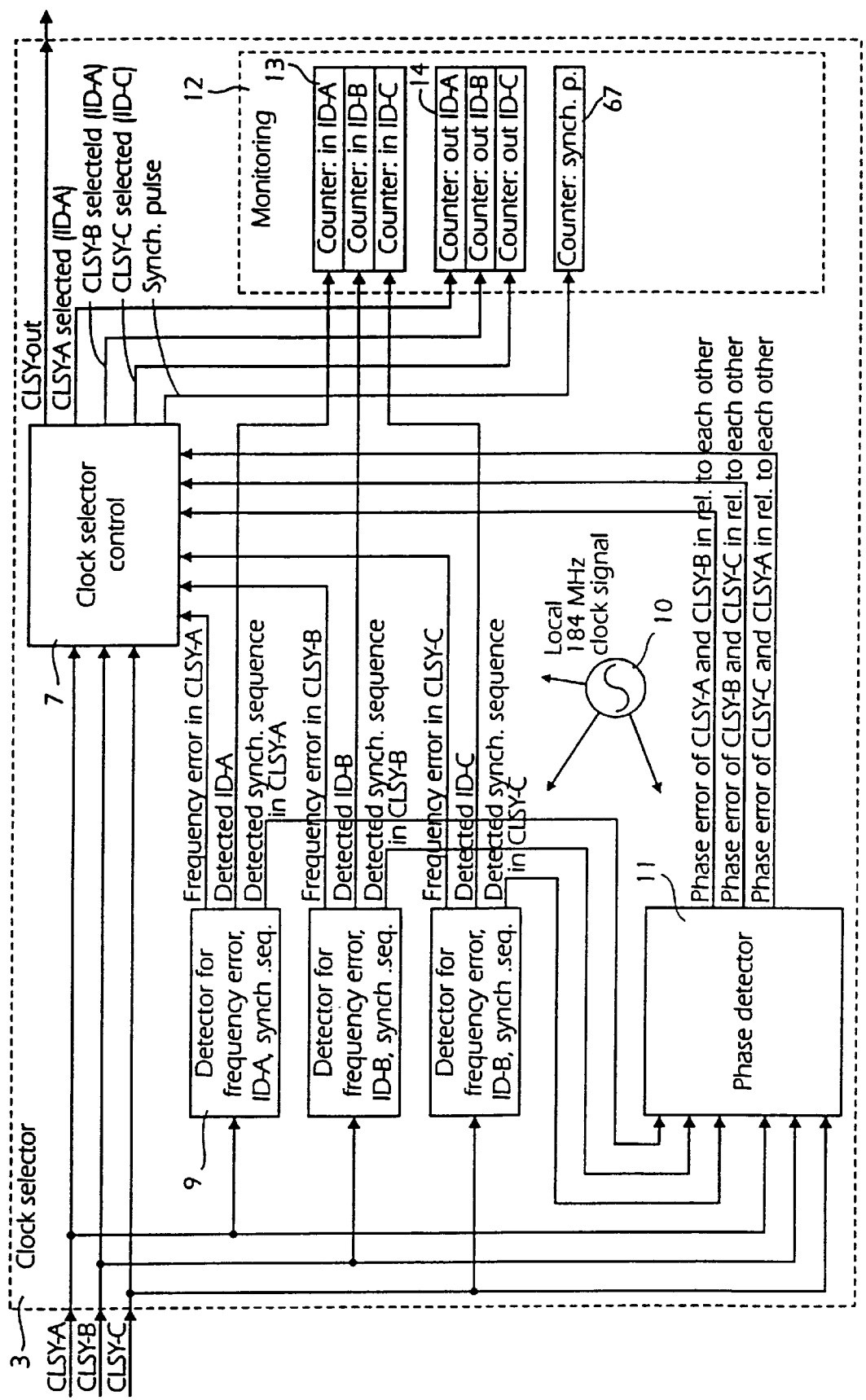
FIG. 4 is a block diagram of a clock selector unit.

The construction of a clock selector 3 is illustrated in the block diagram of FIG. 4. The central portion thereof is a clock selector controller unit 7 that mainly performs logical choices based on different signals from detectors and comprises a multiplexer. The different composite clock signals CLSY-A, CLSY-B and CLSY-C arrive to a clock selector unit 3. Such an arriving signal is communicated to a detector 9 that makes a determination whether the high frequency of the base band signal is correct in the arriving composite clock signal.

Further, the detector 9 extracts identity codes which exist in the arriving signal and provides pulses at each time when such an identity code is encountered. Further, also such a detector 9 provides an output pulse at each time that a sequence S of pulses in the input signal which indicates the synchronization, is found.

Further, in a clock selector unit 3 a phase detector 11 is provided that determines both whether the phase of the pulses having the higher frequency, the base band frequency, agrees with each other in the different signals and whether, the phase of the synch patterns agrees and that provides signals when agreement is not detected. The clock selector 3 comprises also a monitor control 12 that comprises suitable program routines or corresponding devices, for example state machines, and also counters 13 for different detected pulse sequences in the arriving composite clock signals and counters 14 for encountered identity codes in the selected composite clock signal. Various circuits in the clock selector 3 also use local clock signals, in particular a clock signal having a frequency of 184 MHz, as illustrated by the clock circuit 10.

Figure 5A:
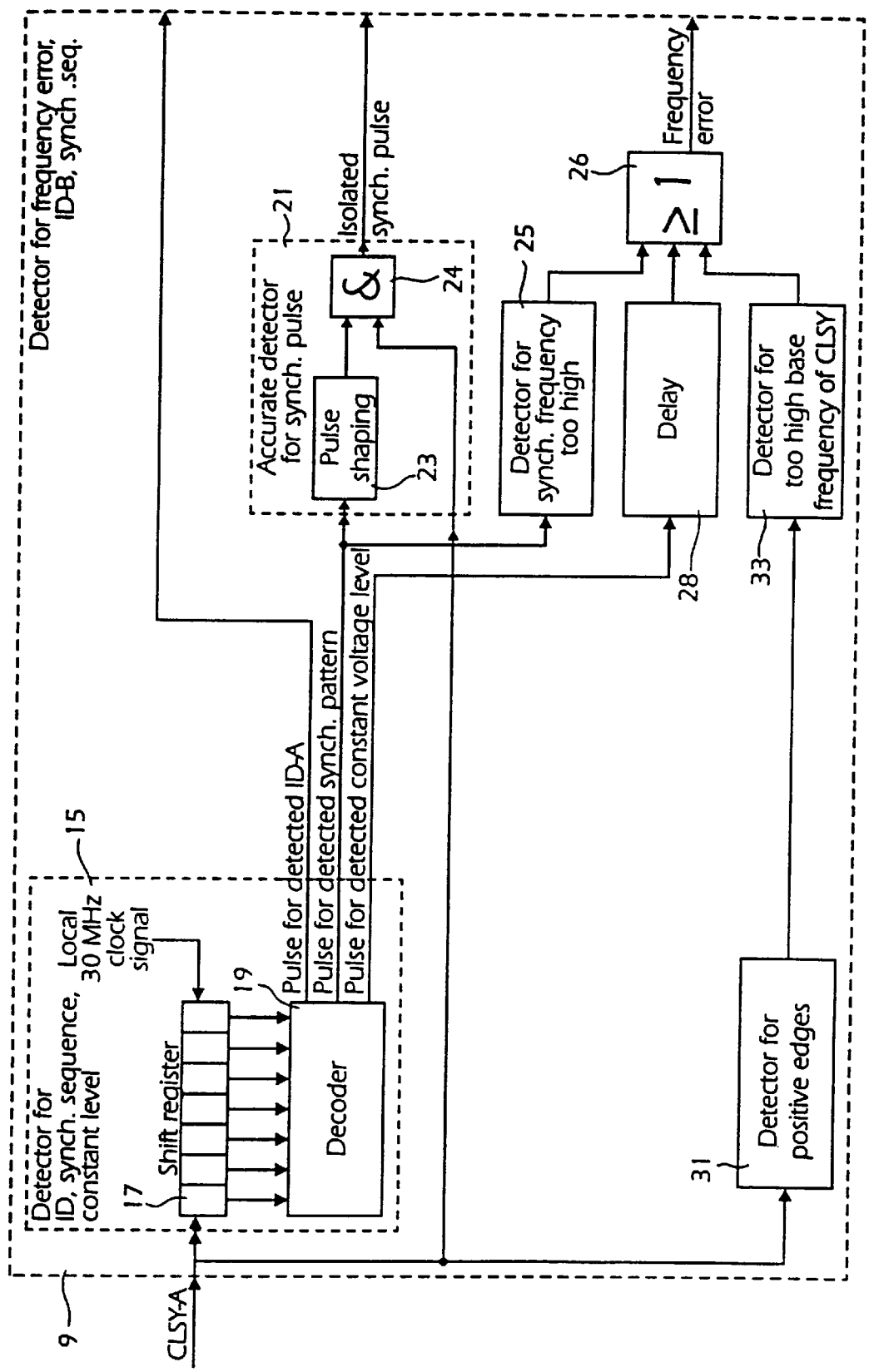
FIG. 5a is a block diagram of a frequency error detector.

The structure of the combined detector 9 for synch pattern, frequency error and ID-codes is illustrated in the block diagram of FIG. 5a. Its main portion is a detector 15 that provides a pulse having a standardized length each time that an identity sequence is encountered or detected in the arriving signal, a similar pulse each time that a synchronizing pulse sequence is detected and further an error signal in the shape of a similar pulse, in the case where the arriving signal has a constant level during a sufficiently long time period. The detector 15 is thus to detect those signal sections i the CLSY-A signal, which in FIGS. 2 and are designated S and ID-A, ID-B, ID-C, respectively. Further, the detector 15 also always provides a signal when the signal sections designated F and P are encountered, since as appears from FIG. 3, during these signal sections the composite clock signal is constant during periods following after each other by the omission of pulses and by the fact that the constant time length during which the state of constant voltage exists, is larger than a threshold value which here is chosen to correspond to five halfperiods of the base band frequency of the arriving composite clock signals. The detector 15 contains a shift register 17, to the input terminal of which one of the composite clock signals is communicated. The clocked shifting in the shift register is produced by means of a locally generated clock signal of 30 MHz (strictly 30.72 MHz). The different positions in the shift register 17 are connected to a decoder 19 which delivers the desired signals on its output terminals.

The combined detector 9 also comprises a detector 21 for an accurate detection of the synchronization patterns in the arriving composite clock signal, compare also the wave form diagrams in FIGS. 5b–5e. Exactly that pulse in the arriving signal, see FIG. 5b, that comes after a detected synch pattern, is forwarded from this detector. For achieving this, first the pulse provided by the detector 15 when it detects a synch pattern is utilized and this pulse has a resolution of 30 MHz, see FIG. 5c. This short pulse is fed to a pulse shaping circuit 23 that also has a suitably adapted delay. The signal provided from the pulse shaping circuit 23 will then get an appropriate length and a time position so that it always covers the pulse following immediately afterwards in the base band signal of 5 MHz in the arriving composite clock signal, see FIG. 5d. Then this longer signal is fed to an AND-gate 24, to the other input of which the composite clock signal CLSY-A is communicated and the an output pulse is obtained from the AND-gate as illustrated in the diagram of FIG. 5e.

Further, in the combined detector 9 a detector 25 is provided for determining whether the frequency of the synchronization pattern is too high or equivalently whether the time period between two synchronization patterns is too short. For this comparison a local clock source is used having for example a frequency of 120 kHz. A signal is provided from the detector 25 in the case where the frequency of the synchronization pattern is decided to be too high and this signal is delivered to an OR-gate 26. On the output terminal of the OR-gate 26 a signal is provided indicating that some sort of frequency error has been detected.

The signal generated in the main detector 15 for indicating that the arriving signal has been detected to be constant during a time period is communicated to a delay circuit 28, the function of which has been described above. The delayed error signal is also forwarded to an input of the OR-gate 26.

The composite signal arriving to the combined detector 9 is also communicated to a act detector 31 that provides a pulse each time that a positive edge or a positive transition exists in the arriving composite clock signal. This is achieved by sampling the arriving CLSY signal by means of a high frequency of 184 MHz that is derived from a local clock source. The rising transitions detected in the sampling are converted to pulses that are used in the following detector 33. It evaluates the frequency of the incoming pulses and provides a signal in the case where the determined frequency is too high. The provided signal is also communicated to the OR-gate 26.

Figure 6A:
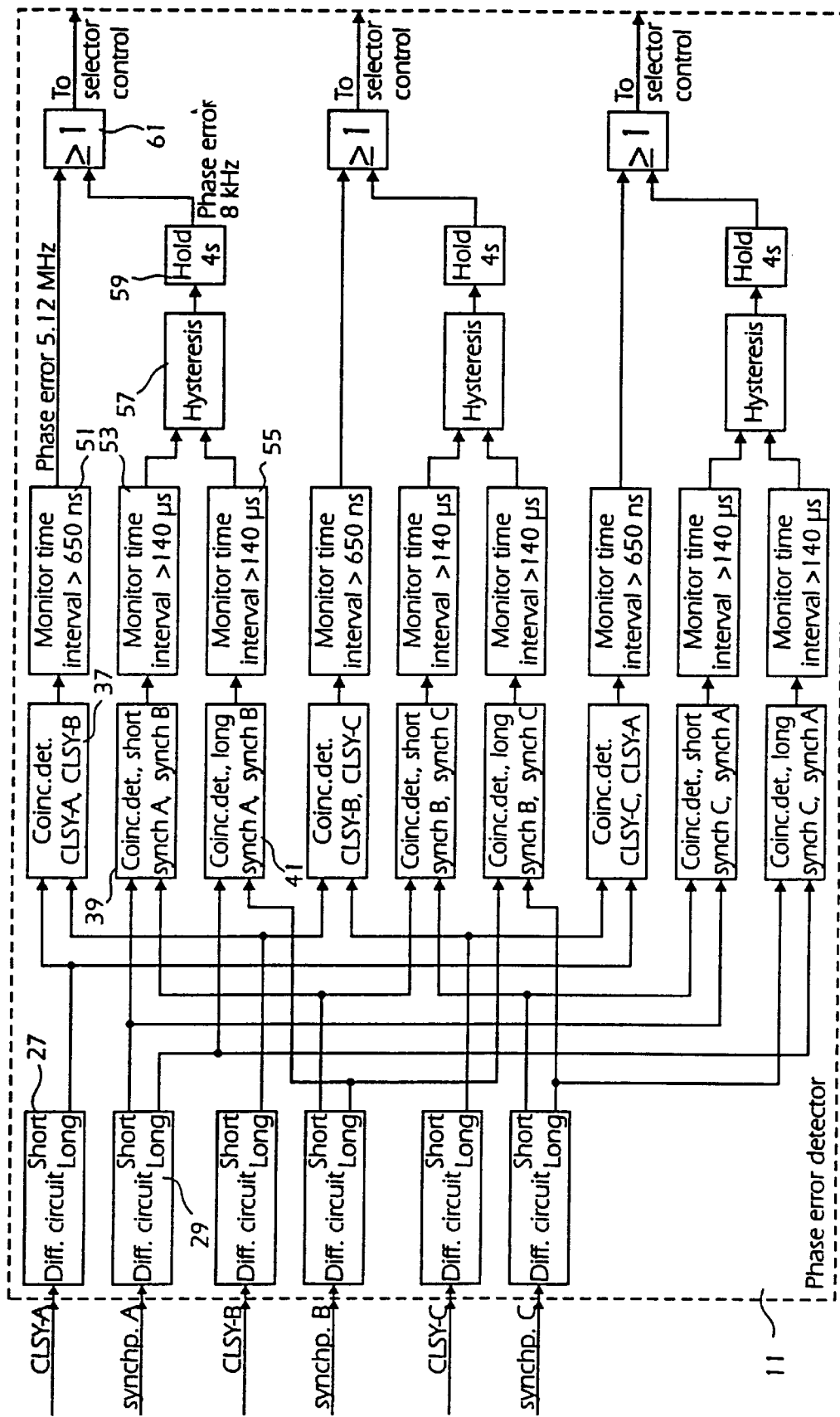
FIG. 6a is acblock diagram of a phase error detector.

In FIG. 6a the construction of the phase detector II is illustrated. Thereto arrive both the composite clock signals CLSY-A, CLSY-B, CLSY-C and the individual pulse that has been isolated from the corresponding composite clock signals and comes immediately after the synchronization section in the signal, as has been described above, here denoted synchp. A, synchp. B and synchp. C, respectively. Each one of these signals is delivered to differentiating circuits 27 and 29, respectively. These differentiating circuits are each one built of a shift register 31', see FIG. 6b, which is clocked by means of the internal, locally generated frequency of 184 MHz, in the same way as has been mentioned for some units above. The shift register 31' has a size of 10 bits. The ninth and tenth positions in the shift register 31' is connected to inverting inputs of two AND-gates 33' and 35, respectively, so that on the output terminals of these gates output pulses are obtained that have different lengths. In FIG. 6c the incoming signal is illustrated as a wave form as a function of time. It continues to a high logical level at a definite time. The output signal from the first AND-gate 33' is illustrated in the corresponding way in FIG. 6d and comprises a pulse, called the short pulse or diff_short, that has a length of eight to nine periods UI (unity intervals) of the local frequency of 184 MHz (strictly 184.32 MHz). The output signal from the other AND-gate 35 is illustrated in the corresponding way in FIG. 6e and comprises a longer pulse, called the long pulse or diff_long, that has a length of nine to ten such periods. The uncertainty of the lengths is illustrated by the shaded fields at 36 and depends on the discrete nature of the local pulse signal having the frequency 184 MHz and its phase position in relation to the input signal in FIG. 6c. However, the long pulse is always exactly one period length longer than the short pulse. The start of the obtained pulses will be accurately determined by the arriving signal, the end, the decreasing edge, is related to the corresponding transitions in the locally generated clock signal having the frequency of 184 MHz.

From the differentiating units 27 for the clock signals only the long differentiation pulse is delivered and these pulses from two differentiation units are fed in pairs to a coincidence detector 37. Three identical such coincidence detectors 37 are then arranged. A coincidence detector 37 consists of, see FIG. 6f, an AND-gate 43 and suitable pulse shaping and pulse delaying circuits 45 connected to the output thereof. When the two input signals In1 and In2 have pulses that overlap, from the detector 37 an output pulse is obtained that has always the length 7 UI as taken in relation to the locally generated clock signal of the high frequency of 184 MHz and that always has a definite phase position in relation thereto. Further, always the time interval between the start of the output pulse and the start of the first arriving pulse comprises a definite number of whole periods (of length UI) of the locally generated clock signal of 184 MHz and in addition thereto possibly a shorter time interval that is shorter than such a period.

Wave forms for the processing of the long pulses from differentiation units 27 in a coincidence detector 37 are illustrated in FIGS. 6g–6i. Here first is illustrated at the top of FIG. 6g–6i, as a function of time, the locally generated pulse signal of 184 MHz. Thereunder the two arriving signal In1 and In2 are shown the coincidence of which is to be determined. Thereunder is shown the output signal from the AND-gate. At the bottom the wave form of the finally provided signal Out is illustrated. In FIG. 6g the pulses of the input signals have a rather large overlap, more than 6 UI, the overlap in FIG. 6*h* only being a fraction of 1 UI. In FIG. 6*i* no overlap exists at all between the input pulses and then naturally no output pulse is obtained.

The same type of coincidence detectors are arranged for the signals as taken in pairs in regard of the differentiated synchronization pulses, both coincidence detectors 39 for the short pulses and coincidence detectors 41 for the long generated pulses.

The signals from the coincidence detectors 37, 39, 41, the pulses of which have a length of seven periods of the locally-generated clock signal of 184 MHz, are communicated to monitoring circuits or detectors 51, 53 and 55 respectively, that provide a signal in the case where the arriving pulses have a too great time interval therebetween. These time intervals are, for the base frequency of the composite clock signal, set to 650 nanoseconds but for the synchronization signal the threshold value is 140 microseconds to be compared to the intended period thereof comprising 125 microseconds.

The threshold value of 650 nanoseconds for the base frequency in the composite clock signal is set so that a frequency reject sequence that has a length of five halfcycles in the signal of 5.12 MHz is not detected as a phase error but a phase reject sequence comprising seven halfcycles of the base band frequency of 5.12 MHz in the arriving clock signal triggers a phase alarm and a signal is delivered from the detector 51. Five halfcycles of the base band frequency 5.12 MHz correspond to a time length of 480 nanoseconds and seven halfcycles correspond to 683 nanoseconds.

Coincidence of the synchronization signals is detected in the interval monitoring circuits 53 and 55, respectively, for the two differentiation pulses having different lengths. From these monitoring circuits 53 and 55 respectively output pulses are provided in the case where the interval between two of these pulses exceeds 140 microseconds.

Figure 6J:
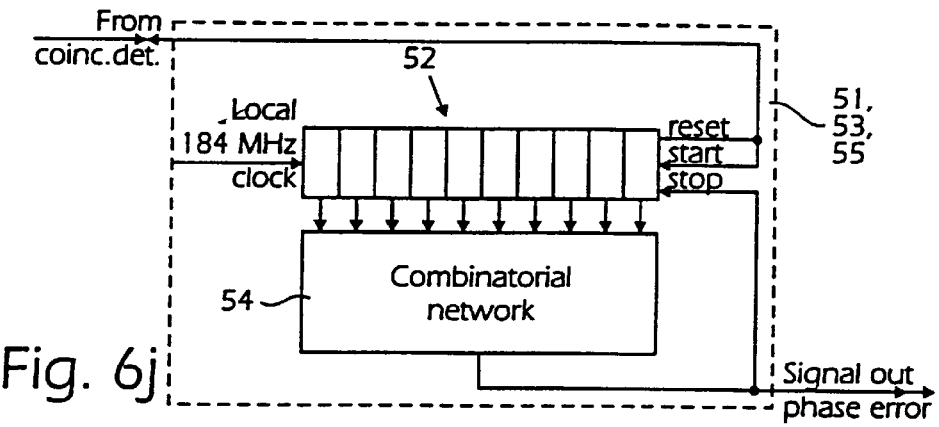
FIG. 6j is a block m of a time interval monitoring unit used in the phase error detector.

The construction of an interval monitoring circuit 51, 53, 55 can be as is illustrated in FIG. 6*j*. A counter 52 is clocked by a locally generated clock signal of for example 184 MHz. The contents of the counter 52 are compared to a threshold value by means of a combinatorial network 54. It provides the output signal of the circuit when the threshold value is achieved and then also the incrementing of the counter 52 is stopped. It is reset and started when being supplied with a signal from a coincidence detector.

The output pulses from each pair of detector circuits 53, 55, that are connected to receive the same pair of incoming signals (synchp. A, synchp. B, synchp. C) are delivered to hysteresis circuit 57 that ensures that a phase error signal of the synch pattern is not generated too often when the phase error is within the magnitude of the threshold value, what otherwise would give unnecessarily frequent phase error signals. This-depends on the fact that the phase of the locally generated clock signal of 184 MHz naturally has no fixed phase relation to the phase of the two incoming clock signals, for which a possible phase error is to be detected. As can be determined from wave form diagrams according to FIGS. 6*g* and 6*h* short pulses having lengths of 8–9 UI from the differentiation circuits can in the worst case give output signals that indicate coincidence in the case where the starts of the pulses are separated by a little less than 9 UI and an output signal that indicates a lack of coincidence, i.e. no output pulse and thus a phase error, in the case where the leading edges of the short pulses are separated by somewhat more than 8 UI. The corresponding condition applies to the long pulses having lengths of 9–10 UI, where all time periods are increased by 1 UI.

Assume for example that CLSY-A and CLSY-B have a phase difference between each other comprising 1 UI and that CLSY-C has a phase difference of 8.5 UI in relation to CLSY-A and 9.5 UI in relation to CLSY-B. In this case CLSY-C can be interpreted both as in phase or out of phase compared to the two other clock signals. First, if CLSY-C is determined to be in phase, the-clock selector will change cyclically between all the three clock signals, what all the time gives a certain average phase in the selected delivered clock signal as an input signal of the PLL 5. After some time period, when the PLL has changed its output phase in relation to the locally generated clock signal of 184 MHz, CLSY-C will however be determined to be out of phase in relation to the other two clock signals. Then the clock selector will instead select alternatingly CLSY-A and CLSY-B providing another value of the average phase to the PLL 5 which then will start oscillating towards the new average phase value in the delivered clock signal. After a further time period CLSY-C will again be judged to be in phase with the two other clock signals. This results in jitter that can be removed by generating both long and short pulses, the length difference always being 1 UI, and by providing the hysteresis function.

Figure 6K:
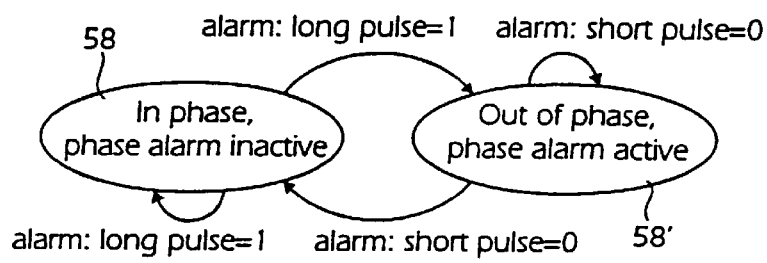
FIG. 6k is a state diagram of a hysteresis circuit used in the phase error detector.

A state diagram of a hysteresis circuit is shown in FIG. 6*k*. It contains two states, a first state 58, which state the machine normally takes when the considered signals are in phase with each other, and a second state 58' which is taken when signals have a phase error. In the second state 58' an alarm signal is provided from the circuit. The state machine passes from the first state to the second state only when it receives a pulse that originally is derived from long pulses, generated by differentiation circuits 29, which pulses have later been processed by a coincidence circuit and an interval monitoring circuit. Then also naturally always pulses are received simultaneously which originate from short pulses. In the same way the state machine passes from the second state to the first state only when it receives pulses that originally come from short pulses, generated by the differentiation circuits 29.

Figure 6L:
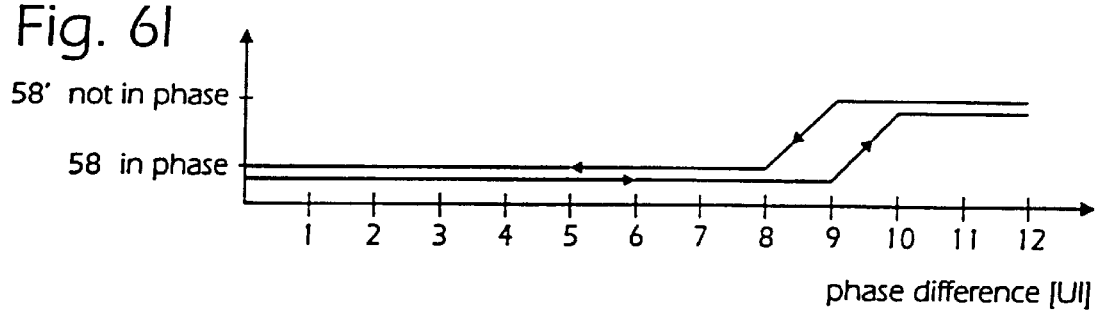
FIG. 6l is a time diagram illustrating the states of the hysteresis circuit.

In FIG. 6*l* a diagram is shown illustrating the hysteresis function. On the abscissa axis the phase difference of the clock signals is plotted in the unit UI (=unit interval of the local clock signal) and on the ordinate axis the two states 58, 58' mof the state machine. Thus, when the phase difference has become a little greater than 9–10 UI, where the uncertainty depends on quantization owing to the local clock signal, a transition is made to the second state, a transition therefrom only being possible when the phase difference has become a little less than 8–9 UI.

Figure 6N:
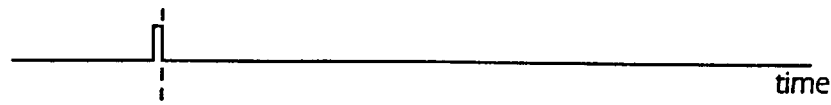
FIG. 6n and 6o are wave form diagrams illustrating the function of a hold circuit.
Figure 6O:
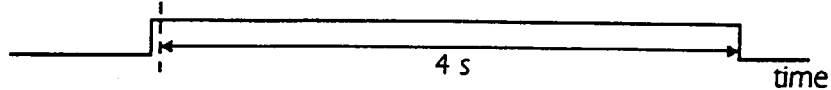

The signal from the hysteresis circuit 57 is delivered to a hold circuit 59, which holds, when it receives a pulse from the hysteresis circuit 57, that indicates a too long period or time interval between coincidence pulses, this pulse during a time period of 4 seconds and thus on its output terminal provides a pulse having a length of at least 4 seconds. This is illustrated by the wave form diagram of FIGS. 6*n*–6*o*, where in FIG. 6*n* a pulse is shown arriving to the hold circuit 59 and in FIG. 6*o* that pulse is illustrated that is provided by the hold circuit and has a guaranteed length of 4 seconds.

Finally, the error signal from the hold circuit 59 is provided to an OR-circuit 61, to the other input terminal of which that signal is fed that indicates whether a too long period exists in the base frequency of the composite arriving signal. The signals from the OR-circuits 61 are then supplied to the clock selector control circuit 7.

Figure 6M:
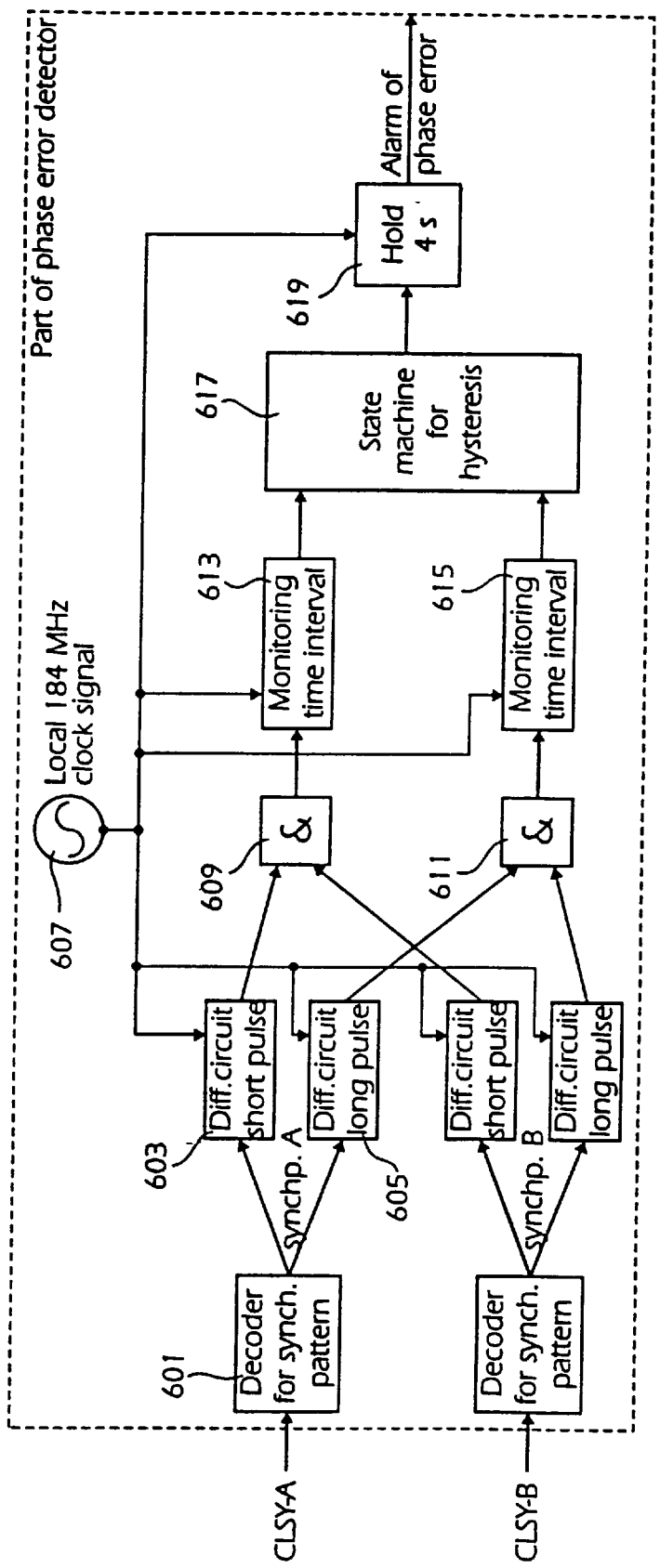
FIG. 6m is a block diagram illustrating how phase errors are monitored.

The circuits for determining phase errors of the synch patterns in two composite clock signals CLSY-A and CLSY-B in relation to each other are illustrated in FIG. 6m. These clock signals are fed to an individual decoder 601 for each clock signal that corresponds to circuits in the block 15 above. Therefrom the retrieved synch pulse is provided and from each decoder 601 it is delivered both to a differentiation circuit 603 for short pulses and to a differentiation circuit 605 for long pulses. The differentiation circuits correspond to the differentiation circuit 29 above and they are clocked by the same clock signal having a high frequency from a local oscillator 607. They thus supply differentiation pulses, the lengths of which always have a difference of one period of the locally generated clock signal. The pulses from the differentiation circuits 603 for short pulses are delivered to a first coincidence detector in the shape of an AND-gate 605 that corresponds to the detector 39 described above. In the corresponding way the pulses from the differentiation circuits 605 for long pulses are fed to a second coincidence detector, an AND-gate 611 corresponding to the detector 41, see FIG. 6a. The signals from the AND-gates 609 and 611 are fed to time interval monitoring units 613 and 615, respectively, which correspond to the monitoring circuits 53 and 55 as described above. Finally, the signals from the monitoring units 613 and 615 are supplied to a hysteresis unit 617, which corresponds to the previously described hysteresis machine 57, and therefrom the signal is supplied to a hold circuit 619 that corresponds to the circuit 59 according to the above and delivers a pulse which is held or maintained 4 seconds as soon as it receives a pulse-having a high logical level on its input terminal. This pulse is also the output signal from the whole circuit and indicates that a phase error exists of the synch patterns of the supplied signals CLSY-A and CLSY-B in relation to each other.

It can be observed that a detector structure according to the above for providing a signal in the case where there exists a too large phase difference will also output a permanent error signal when a small frequency error exists in the synch patterns in the arriving signals in relation to each other. Thus, if a small frequency difference exists in the arriving error signals, for example of the magnitude of order of 1 ppm or less, it will become apparent in the shape of the fact that the phase between the two synch signals varies and at some times is smaller than the threshold limit for detection of phase errors and at times is greater than the threshold limit, i.e. a signal indicating a phase error will be generated periodically. By introducing the hold circuit 619 and 59, respectively, frequency errors that generate such periodically repeated phase error signals will be detected as a constant phase error in the case where the period during which no error signal is generated is less than the hold time in the circuits 617 and 619, respectively. For the frequencies and times as indicated above it would correspond to the case that frequency errors larger than about 0.01 ppm are detected.

Figure 7A:
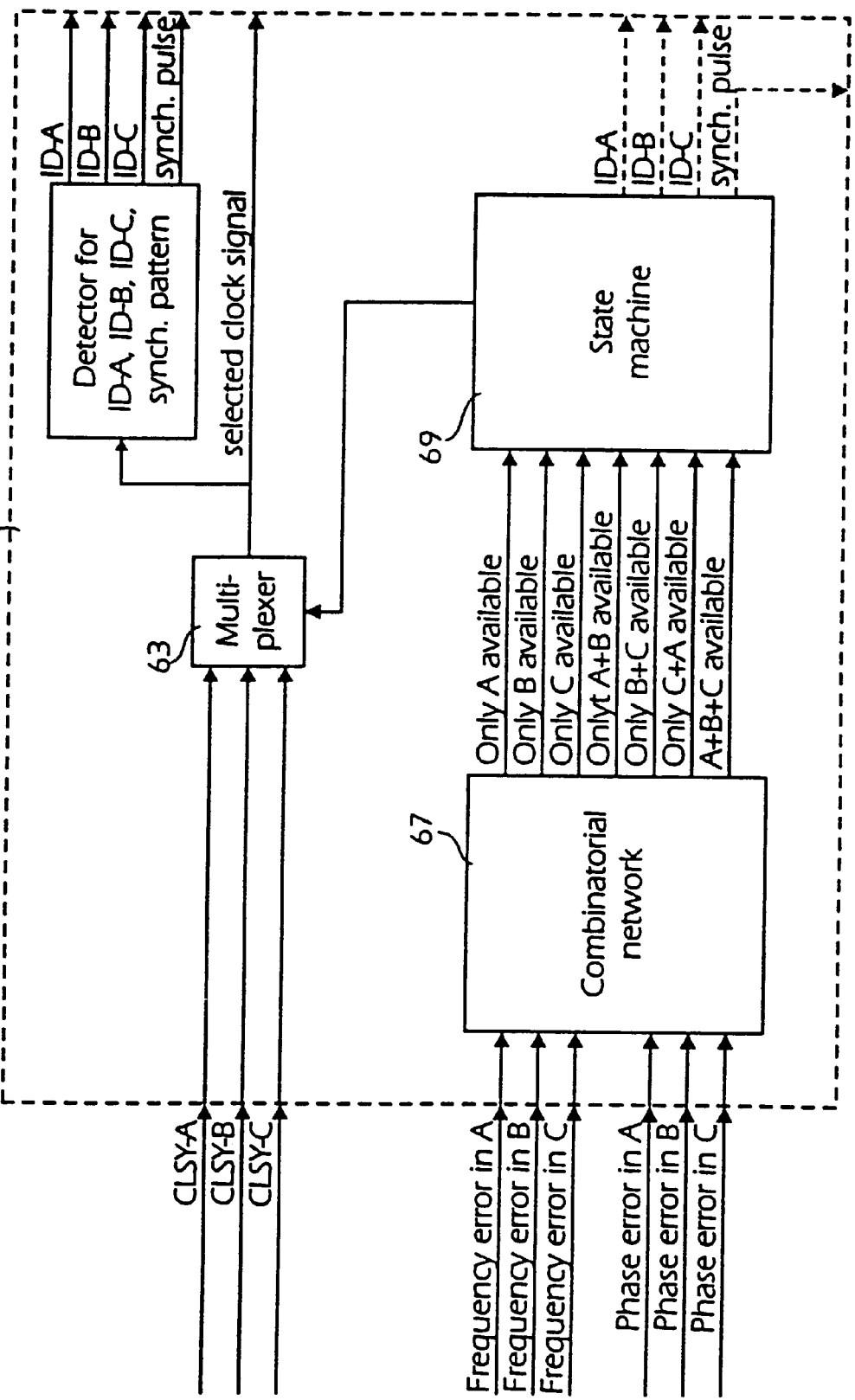
FIG. 7a is a block diagram of a clock selector control.

The clock selector control 7 is shown in FIG. 7a. The composite clock signals CLSY-A, CLSY-B and CLSY-C are fed to a multiplexer 63. The frequency error signals of the composite signals CLSY-A, CLSY-B and CLSY-C are fed to a combinatorial network 67, which also receives the corresponding phase error signals of the composite clock signals. The combinatorial network 67 provides signals on its output terminal indicating that only the clock signal A or B or C is available, that only both A and B are available, that only both B and C are available, that only both C and A are available and finally that all three signals A and B and C are available. The truth table of the combinatorial network is shown in FIG. 7b.

The availability signals are fed to a state machine 69 controlling the multiplexer 63 according to a programmed control scheme. This control scheme is illustrated by the state diagram of FIG. 7c. Three states 71, 73 and 75 are provided, one for each one of the three composite clock signals CLSY-A, CLSY-B, CLSY-C, in which exactly this clock signal is the selected signal, that signal which is to be provided from all of the clock selector 3 and in particular from the clock selector control 7. The machine passes from the state 71, CLSY-A selected, to the state 73, CLSY-B selected, in the case where some of the signals "only CLSY-B available" or "only CLSY-B and CLSY-C available" exist. The machine passes from the state 71, CLSY-A selected, to the state 75, CLSY-C selected, in the case where the signal "only CLSY-C available" exists. The machine passes from the state 73, CLSY-B selected, to the state 75, CLSY-C selected, in the case where some of the signals "only CLSY-C available" or "only CLSY-C and CLSY-A available" exist. The machine passes from the state 73, CLSY-B selected, to the state 71, CLSY-A selected, in the case where the signal "only CLSY-A available" exists. The machine passes from the state 75, CLSY-C selected, to the state 71, CLSY-A selected, in the case where some of the signals "only CLSY-A available" or "only CLSY-A and CLSY-B available" exist. The machine passes from the state 75, CLSY-C selected, to the state 73, CLSY-B selected, in the case where the signal "only CLSY-B available" exists.

The composite clock signal selected by the multiplexer 63 is then supplied to the corresponding phase-locked loop circuit for retrieving system bit clock and synch rate, which are then distributed for use in the respective plane, and also to a regenerator 6, see FIG. 1, in the case where further cascaded units are provided. From the selected clock signal, in a detector circuit 77, also possible encountered ID-codes and synch patterns are extracted for supplying count pulses each time that they are encountered for incrementing the count registers 14 and 67, respectively, see FIG. 4, in order to be processed by the monitoring unit 12.

Alternatively, count pulses corresponding to the ID-code that is valid for the clock signal selected at the considered time, could be supplied directly by the state machine 69, as is indicated by dotted lines, and also a count pulse corresponding to the arriving synchronization pulse for updating the counters.

In FIG. 8 a schematic picture of a plane in a subsystem is illustrated that schematically shows several of the components discussed above. The composite clock signals CLSY-A, CLSY-B and CLSY-C thus arrive to the multiplexer or switch 63, which is controlled by signals from the state machine 69 and normally all the time provides as an output signal, i.e. a selected signal, a clock signal that changes between the arriving clock signals at approximately regularly repeated times, in a cyclic schematic such as . . . CLSY-A→CLSY-B→CLSY-C→CLSY-A→CLSY-B→CLSY-C→. . .

The state machine 69 is here illustrated as incorporated in a control unit 70, which in addition to the state machine includes the combinatorial network 67. The control unit 70 receives as input signals the alarm signals, which thus are related to frequency error in clock signal A, frequency error in B, frequency error in C, phase error in A, phase error in B, phase error in C, both from the synch pattern, frequency error and ID-detectors 9 and from the phase error detectors 11. The combined detectors 9 first mentioned are here illustrated as divided into blocks 9', 9", where the former ones supply the frequency error signals and the latter ones deliver a signal for detected, preselected ID-code, for incrementing the registers 13 for the number of received ID-pulses. The input signals to the control unit 70 determine transitions between different states in the state machine 69 through the combinatorial network 67. Also in the composite signal selected by the switch 63 the ID-pulses are determined by means of the synch pattern and ID-detector 77 for incrementing the registers 14. This detector also supplies a signal for incrementing the register 67 containing a stored value that indicates the number of received or detected synch patterns. The selected clock signal is also delivered to the phase-locked loop circuit PLL 5 for retrieving a system bit clock and synch pulses.

Here also a control and monitoring unit 79 is illustrated in the shape of a processor that is controlled by a program stored in memory means 81. The control and monitoring unit 79 monitors, at periodically repeated occasions, the values which at these instances are stored in the different registers 13, 14, 67, in order to determine whether these values are as they can be expected to be and to deliver an alarm signal to some superior unit or operator in the case where the values are not the expected ones.

What is claimed is:

1. A method of supplying a clock signal to in subsystems in an electronic system comprising:

supplying substantially identical clock signal on at least three different, independent lines to a subsystem, producing in the subsystem a clock signal corresponding to one of the signals received on the different lines or, performing, in the production of a clock signal in the subsystem, a selection of a clock signal among the clock signals received independently and in parallel by at least two different selection processes working independently of each other, so that at least two clock signals are selected, letting the selected, at least two clock signals, pass to components in the subsystem, through switches in the subsystem, and controlling the switches by the at least two selection processes, so that when required or desired a change to a new one or another of the received clock signals can be made and this new or another clock signal is instead passed to the components.

2. A method according to claim 1, further comprising evaluating, in the selection of a clock signals in a selection process in the subsystem, all the received clock signals in regard of their characteristics.

3. A method according to claim 2, wherein the number of different, independent processes for selection of clock signals in the subsystem is equal to the number of lines on which the clock signal arrives to the subsystem.

4. A method according to claim 1, further comprising evaluating, in selecting a clock signal to be switched, the signals received on the at least three different lines or channels in regard of errors as to their frequency and/or phase position of a signal in relation to the phase positions of the other received signals, this evaluation being made independently by the different processes.

5. A method according to claim 4, comprising generating the clock signal as a train of pulses from which timing information can be derived, so that the pulse train substantially agrees with a pulse train chosen as a main template, and generating the clock signal, for introducing a frequency error therein, so that the clock signal agrees with the main template pulse train except that a first predetermined number of successive pulses have been omitted, and/or generating the clock signal, for introducing a phase error therein, so that the clock signal agrees with the main template pulse train except that a second predetermined number of successive pulses have been omitted, where in the respective case the second predetermined number is larger than the first predetermined number.

6. A method according to claim 5, comprising by generating the clock signal, so that the main template pulse train comprises a fixed template pulse subtrain repeated with a definite time period and so that the predetermined position where pulses are omitted has a fixed position in time within each period of the main template pulse train.

7. A method according to claim 1, further comprising determining, in the evaluation for selecting a clock signal, errors in each signal received on the different lines, counting the number of the errors, and evaluating the number of counted errors in each such signal in order to determine whether any such signal is faulty and/or whether some component used in generating, transferring, receiving, evaluating or selecting a signal is faulty.

8. A method according to claim 1, further comprising generating the clock signal supplied on the at least three different, independent lines to the subsystem in at least three different clock sources to produce the same number of clock signals, each generated clock signal having substantially identical timing information and each generated clock signal being supplied on a different one of the independent lines, entering, in the generation of each of the clock signals, intentional errors in the respective clock signal, detecting, in the selection processes in the subsystem, the intentional errors, for deselection of a clock signal having such a detected error and selecting, after the detection of an error in a clock signal selected in a considered selection process, another received clock signal, and the errors in the clock signals being entered in such a way that the different processes for selection of a clock signal in the subsystem will all the time, cyclically and/or in a way that is regular or periodic in time, change to a new selected signal in the case where there are at least two signals among which to select.

9. A method according to claim 8, comprising evaluating the number of selections of a new selected clock signal and/or the number of changes to a new clock signal, which is passed through a switch, for determining whether a received clock signal is faulty and/or a component used in generating, transferring, receiving, evaluating or selecting a clock signal is faulty.

10. A method according to claims 8, comprising evaluating a sequence of selections of a new selected signal and/or changes to a new clock signal, which is passed through a switch, for determining whether a received clock signal is faulty and/or a component used in generating, transferring, receiving, evaluating or selecting a clock signal is faulty.

11. A method according to claim 10, comprising by including, in the evaluation of a sequence of selections and/or changes, also the times when the selections or changes have been made.

12. A method according to claim 8, comprising entering, in the generation of the clock signal, information therein indicating the identity of the clock signal and/or the identity of the line, on which the clock signal is supplied to the subsystem, detecting in the subsystem, in a process for selecting a clock signal, such identity information in a selected signal, determining, when such information is detected in a selected clock signal, the identity with which the information is associated, evaluating such information for determining whether an arriving clock signal is faulty and/or a component used in generating, transferring, receiving, evaluating or selecting a clock signal is faulty.

13. A method according to claim 12, comprising including, in the evaluation of the information, also the times when the information is determined.

14. A method according to claim 12, comprising counting, in evaluating the information, the number of times that different identities are determined, and evaluating the counted numbers for determining whether a received clock signal is faulty and/or a comprising used in generating, transferring, receiving, evaluating or selecting a clock signal is faulty.

15. A method according to claim 12, comprising generating the clock signal as a train of pulses from which timing information can be derived, so that the pulse train substantially agrees with a pulse train chosen as a main template, and generating the clock signal, for entering identity information therein, so that it agrees with the main template pulse train except within at least one predetermined section, within which the clock signal is generated so that it agrees with an identity template pulse train, which corresponds to a deformed section of the main template pulse train.

16. A method according to claim 15, comprising generating the clock signal so that the main template pulse train comprises a fixed template pulse subtrain repeated with a determined time period and so that the predetermined section that agrees with an identity pulse train has a fixed position in time within each period of the main template pulse train.

17. A method according to claim 12, comprising generating the clock signal as train of pulses from which timing information can be derived, so that the pulse train substantially agrees with a pulse train chosen as a main template, and generating the clock signal, for entering identity information therein, so that it agrees with the main template pulse train except that at least one pulse having a predetermined position in time in the main template pulse train is omitted.

18. A method according to claim 17, comprising generating the clock signal, so that the main template pulse train comprises a fixed template pulse subtrain repeated with a determined time period and so that the predetermined position where a pulse is omitted has a fixed position in time within each period of the main template pulse train.

19. A method according to claim 12, comprising generating the clock signal as train of pulses from which timing information can be derived, so that the pulse train substantially agrees with a pulse train chosen as a main template, in which each pulse comprises a first transition from a first level to a second level and a second transition from the second level to the first level, so that the main template pulse train comprises a sequence or train of such transitions, and generating the clock signal, for entering identity information therein, so that it agrees with the main template pulse train except that at least one transition having a predetermined position in the main template pulse train is changed, and a transition of a kind opposite to the changed transition and having a predetermined position is changed to the kind of the changed transition.

20. A method according to claim 19, comprising generating the clock signal, so that the main template pulse train comprises a fixed template pulse subtrain repeated with a definite time period and so that the predetermined position of the changed transition has a fixed time position within each period of the main template pulse train.

21. A method according to claims 1, further comprising generating the clock signal supplied on the at least three different, independent lines to the subsystem in at least three different clock sources to produce the same number of clock signals, each generated clock signal having substantially identical timing information and each generated clock signal being supplied on a different one of the independent lines, entering, in the generation of each of the clock signals, intentional frequency and phase errors in each of the clock signals, and detecting, in the selection processes in the subsystem, the intentional errors and determining whether they are frequency and/or phase errors, for deselection of a clock signal having such a detected error and selecting, after the detection of an error in a clock signal selected in a considered selection process, another received clock signal, and delaying the selection of another clock signal, after detecting a frequency error in a selected clock signal, by a time period having a length, which is chosen, so that it corresponds to such a time period length that, when an intentionally entered error has been detected in a clock signal selected at the instant and the error has been determined to be a frequency error, the selection of another clock signal will not be made immediately after the determination that the error is a frequency error but directly after a determination whether the error also is a phase error.

22. A method according to claim 1, comprising supplying or communicating the at least two independent selected signals, each one on its own independent line, to a second subsystem as included in a clock signal of the second subsystem, in which the selection of and switching clock signal is made in substantially the same way as in the first subsystem.

23. The method of claim 1, further comprising the steps of:

generating the clock signal supplied on at least three different, independent lines to the subsystem in such a way that intentional errors are entered in the clock signal;

detecting in the selection processes in the subsystem the intentional errors in each clock signal received on one of the different lines;

counting a number of errors in each received clock signal; and evaluating the number of errors counted in each received clock signal for determining at least one of whether a received clock signal is faulty and whether a component used in generating, transferring, receiving, evaluating or selecting a clock signal is faulty.

24. The method of claim 1, further comprising the steps of:

generating the clock signal supplied on at least three different, independent lines to the subsystem in such a way that intentional errors are entered in the clock signal;

detecting in the selection processes in the subsystem the intentional errors in each clock signal received on the different lines;

evaluating the detected errors in each received clock signal for determining at least one of whether a received clock signal is faulty and whether a component used in generating, transferring, receiving, evaluating or selecting a clock signal is faulty.

25. A network for processing information and for performing processes in different stations and for forwarding information between stations, comprising circuits arranged in a first station for generating substantially identical clock signals, at least three different independent transmission channels from the first station to a second station for communicating the substantially identical clock signals in parallel and independently to the second station, at least two selector units working independently of each other in the second station, lines arranged in the second station for communicating the signals on all the incoming independent channels to each one of the at least two selector units working independently of each other, each selector unit being arranged to perform, independently of and in parallel to other selector units a selection of a clock signal among the incoming signals, switches in the second station for letting the selected, at least two clock signals, pass to the second station, to be used in one of several redundant planes arranged in parallel and working independently of each other in the second station, and control lines from a selector unit to an associated switch for controlling the switch, so that when required or desired a change of the signal provided by the switch to a new one or another of the received clock signals can be made and this new or another clock signal is instead passed to the second station.

26. A network according to claim 25, wherein the circuits in the first station comprise at least three different clock sources that each are arranged to generate a substantially identical clock signal.

27. A network according to claim 25, wherein the number of independently working selector units is equal to the number of different independent transmission channels.

28. A network according to claim 25, wherein an independently working evaluation unit is associated with each independently working selector unit for evaluation of all the signals received on the independent channels in regard of their characteristics.

29. A network according to claim 28, wherein each evaluation unit is arranged to evaluate, independently of and in parallel to another evaluation unit, the signals received from the independent channels in regard of errors in at least one of their frequency and the phase position of a signal in relation to the phase position of the other received signals.

30. A network according to claim 28, comprising memory means in the second station for storing, for each clock signal, the number of encountered errors, evaluation means associated with the selector units for evaluating the received clock signals in regard of errors therein and arranged to determine the number of errors in each received clock signal and to store the number of counted errors in the memory means arranged therefor, monitoring means for monitoring the numbers stored in the memory means and for determining as guided thereby whether a clock signal is faulty and/or a circuit used in generating, transmitting, receiving and evaluating the signal is faulty.

31. A network according to claim 29, wherein the circuits in the first station comprise at least three different clock sources for generating substantially identical clock signals, each of which is supplied on one of the independent channels, the clock sources in the first station are arranged to enter intentional errors in the generated clock signals, and the clock sources are arranged to enter the errors in the clock signals in such a way that the selector units in the second station all the time select a new selected signal or the switches all the time change to another signal, that is provided by the switch, in the case where the selection can be made among at least two received signals.

32. A network according to claim 31, wherein the clock sources are arranged to enter the errors in the clock signals in such a way that the selector units in a way that is regular in time change select a new selected signal or the switches in a way that is regular in time change to another signal, which is provided from the switch.

33. A network according to claim 25, wherein the circuits in the,first station are arranged to enter intentional errors in the clock signal when generating it, memory means associated with each selector unit and each signal received on the different transmission channels, detector means associated with each selector unit and connected to the memory means associated with the same selector unit, the detector means being arranged to detect errors in the received signals and to store the number of errors detected in each signal in the memory means, and evaluation means being connected to the memory means for evaluating the number of stored errors in the memory means and arranged for determining whether a received signal is faulty and/or whether a circuit used in generating, transferring, receiving, evaluating or selecting a signal is faulty.

34. The network of claim 25, wherein the circuits in the first station are arranged to enter intentional errors into the clock signal when generating the clock signal, detector means associated with each selector unit are arranged for determining errors in each signal received by the selector unit on one of the different channels, memory means connected to the detector means are arranged for storing information in regard of detected errors, and evaluation means connected to the memory means are arranged for evaluating the information in regard of errors in each received signal for determining at least one of whether a received signal is faulty and whether a circuit used in generating, transferring, receiving, evaluating or selecting a signal is faulty.

35. The network of claim 34, wherein the circuits in the first station comprise at least three different clock sources, each of which is arranged to generate a clock signal comprising substantially identical timing information, for delivery on an equal number of independent channels to the second station;

the clock sources are arranged to enter, when generating each clock signal, intentional frequency and phase errors in the clock signals; and an evaluating unit is associated with a selector unit in the second station for delaying, when evaluating a received signal that is selected at an instant, when detecting a frequency error in the selected received signal, a selection of another selected signal or a change of the signal provided by the switch to a new signal by a time period having a length that is chosen to correspond to such a time period length that, when an intentionally entered error has been detected in a clock signal selected at the instant and the error has been determined to be a frequency error, the selection of another clock signal will not be made immediately after the determination that the error is a frequency error but directly after a determination whether the error also is a phase error.

36. The network according to claim 35, comprising memory means associated with each selector unit for storing information in regard of a sequence of selections of a new selected signal and/or with each switch for storing the number of changes to another signal provided by the switch, and monitoring means connected to the memory means for monitoring the information stored in the memory means and for determining therefrom whether a received signal is faulty and/or whether a circuit used in generating, transferring, receiving, evaluating or selecting a signal is faulty.

37. The network according to claim 36, wherein the stored information includes information in regard of the time when the selection or change was made.

38. The network of claim 25, wherein the circuits in the first station comprise at least three different clock sources for generating substantially identical clock signals, each of which is supplied on a respective one of the independent channels, the clock sources are arranged to enter into each clock signal information indicating an identity of the clock signal, memory means are associated with each selector unit in the second station and with each signal received on the independent channels, monitoring means are connected to the memory means for monitoring at least one of the signal selected by a selector unit in regard of identity information and the signal provided by a switch; for determining, when such information is encountered in the signal, the clock signal to which the information belongs; for storing in each memory means a number of times that information pointing to the clock signal with which the memory means is associated is detected; and for evaluating the stored numbers for determining at least one of whether an arriving clock signal is faulty and whether a circuit used in generating, transferring, receiving, evaluating or selecting a signal is faulty.

39. The network according to claim 38, wherein the clock sources are arranged to generate each clock signal as a train of pulses, from which timing information can be derived, the pulse train substantially agreeing with a pulse train chosen as a main template, and the clock sources, for entering identity information in a clock signal, are arranged to generate the clock signal, so that it agrees with the main template pulse train except within at least one predetermined section, within which the clock signal is generated, so that it agrees with another template pulse train, that corresponds to a deformed section of the main template pulse train.

40. The network according to claim 39, wherein a clock source is arranged to generate the clock signal, so that the main template pulse sequence comprises a fixed template pulse subtrain repeated with a definite time period and so that the predetermined section which has a lacking agreement has a fixed position in time within each period of the main template pulse train.

41. The network according to claim 38, wherein the clock sources are arranged to generate each clock signal as a train of pulses, from which timing information can be derived, the pulse train substantially agreeing with a pulse train chosen as a main template, and the clock sources, for entering identity information in a clock signal, are arranged to generate the clock signal, so that it agrees with the main template pulse train except that at least one pulse having a predetermined position in the main template pulse train has been omitted.

42. The network according to claim 41, wherein a clock source is arranged to generate the clock signal, so that the main template pulse train comprises a fixed template pulse subtrain repeated with a definite time period and so that the predetermined position where a pulse is omitted has a fixed position in time within each period of the main template pulse train.

43. The network according to claim 38, wherein the clock sources are arranged to generate each clock signal as a train of pulses, from which timing information can be derived, the pulse train substantially agreeing with a pulse train chosen as a main template, in which each pulse comprises a first transition from a first level to a second level and a second transition from the second level to the first level, so that the main template pulse train comprises a train of such transitions, and the clock sources, for entering identity information in a clock signal, are arranged to generate the clock signal, so that it agrees with the main template pulse train except that at least one transition having a predetermined position in the main template pulse train is changed, and that a transition of a kind opposite the changed transition and having a predetermined position is changed to the kind that the changed transition has.

44. The network according to claim 43, wherein a clock source is arranged to generate the clock signal, so that the main template pulse train comprises a fixed template pulse subtrain repeated with a definite time period and so that the predetermined position has a fixed position in time within each period of the main template pulse train.

45. The network of claim 25, wherein the circuits in the first station comprise at least three different clock sources for generating substantially identical clock signals, each of which is supplied on a respective one of the independent channels, the clock sources are arranged to enter in each clock signal information indicating an identity of the clock signal, memory means are associated with each selector unit in the second station, monitoring means are connected to the memory means for monitoring at least one of the signal selected by a selector unit and the signal provided by a switch associated with the selector unit in regard of identity information; for determining, when such information is detected in the selected signal, the clock signal with which the information is associated; for storing in each memory means information in regard of the clock signal to which the information points; and evaluating the stored information for determining at least one of whether an arriving clock signal is faulty and whether a circuit used in generating, transferring, receiving, evaluating or selecting a signal is faulty.

46. The network according to claim 45, wherein the stored information comprises information in regard of the time when the identity information was detected and/or the information was stored.

47. The network of claim 31, further comprising:
memory means associated with at least one of each selector unit for storing a number of selections of a new selected signal and each switch for storing a number of changes to another signal provided by the switch, and
monitoring means connected to the memory means for monitoring the number stored in the memory means and for determining therefrom at least one of whether a received signal is faulty and whether a circuit used in generating, transferring, receiving, evaluating or selecting a clock signal is faulty.

* * * * *

UNITED STATES PATENT AND TRADEMARK OFFICE
CERTIFICATE OF CORRECTION

PATENT NO.    : 6,195,758 B1
DATED         : February 27, 2001
INVENTOR(S)   : Peter Lundh et al.

Page 1 of 1

It is certified that error appears in the above-identified patent and that said Letters Patent is hereby corrected as shown below:

<u>Title page,</u>
Assignee, please remove the characters "le;.5q" before the assignee name.
The Assignee should be -- Telefonaktiebolaget LM Ericsson --

Signed and Sealed this

Sixteenth Day of April, 2002

Attest:

Attesting Officer

JAMES E. ROGAN
Director of the United States Patent and Trademark Office